(12) United States Patent
Kuwahara et al.

(10) Patent No.: US 11,330,425 B2
(45) Date of Patent: May 10, 2022

(54) COMMUNICATION SYSTEM, COMMUNICATION METHOD, AND COMMUNICATION PROGRAM

(71) Applicant: HITACHI, LTD., Tokyo (JP)

(72) Inventors: Mikio Kuwahara, Tokyo (JP); Masanori Taira, Tokyo (JP)

(73) Assignee: HITACHI, LTD., Tokyo (JP)

(*) Notice: Subject to any disclaimer, the term of this patent is extended or adjusted under 35 U.S.C. 154(b) by 34 days.

(21) Appl. No.: 16/752,746

(22) Filed: Jan. 27, 2020

(65) Prior Publication Data
US 2020/0304987 A1 Sep. 24, 2020

(30) Foreign Application Priority Data

Mar. 18, 2019 (JP) .............................. JP2019-049308

(51) Int. Cl.
*H04W 52/02* (2009.01)
*G06F 1/3234* (2019.01)
(Continued)

(52) U.S. Cl.
CPC .......... *H04W 8/24* (2013.01); *H04W 72/0413* (2013.01); *H04W 72/0453* (2013.01); *H04W 76/18* (2018.02)

(58) Field of Classification Search
CPC ...... H04L 67/12; H04W 88/04; H04W 84/12; H04W 52/0216; H04W 52/02; H04W 52/0261; H04Q 2209/88
(Continued)

(56) References Cited

U.S. PATENT DOCUMENTS

2010/0128705 A1* 5/2010 Miyoshi .............. H04W 52/226
370/338
2013/0143499 A1* 6/2013 Ando .................... H04W 4/021
455/41.2
(Continued)

FOREIGN PATENT DOCUMENTS

JP 2005-086650 A 3/2005
JP 2017-017543 A 1/2017
(Continued)

OTHER PUBLICATIONS

Notice of Reasons for Refusal dated Jan. 4, 2022, issue in corresponding Japanese Patent Application No. 2019-049308.

*Primary Examiner* — Syed Ali
*Assistant Examiner* — Jason A Harley
(74) *Attorney, Agent, or Firm* — Mattingly & Malur, PC

(57) ABSTRACT

A communication system includes: a terminal configured to perform a predetermined operation and including a communication device configured to transmit first information relating to the predetermined operation by a first communication method; and a server apparatus configured to receive information transmitted from the terminal. The communication device transmits second information indicating a status of the terminal by a second communication method different from the first communication method, and the server apparatus determines whether the first information is normally received from the terminal and, when determining that the first information is not normally received, performs predetermined processing depending on a communication status of the terminal based on the received second information.

9 Claims, 18 Drawing Sheets

(51) Int. Cl.
*G06F 1/32* (2019.01)
*H04W 8/24* (2009.01)
*H04W 76/18* (2018.01)
*H04W 72/04* (2009.01)

(58) Field of Classification Search
USPC ........................................ 370/328; 455/67.11
See application file for complete search history.

(56) References Cited

U.S. PATENT DOCUMENTS

| | | | |
|---|---|---|---|
| 2016/0036674 A1* | 2/2016 | Tanaka | H04L 1/20 |
| | | | 370/252 |
| 2017/0034777 A1* | 2/2017 | Nagamatsu | H04N 21/43637 |
| 2018/0103426 A1* | 4/2018 | Nacer | H04W 52/0209 |
| 2018/0206277 A1* | 7/2018 | Krenz | H04W 76/15 |
| 2019/0037639 A1* | 1/2019 | Nolan | H04B 7/155 |
| 2020/0389938 A1* | 12/2020 | Ogawa | H04L 12/2834 |

FOREIGN PATENT DOCUMENTS

| | | |
|---|---|---|
| JP | 2018-117180 A | 7/2018 |
| WO | 2017/188086 A1 | 11/2017 |

* cited by examiner

OPERATION INFORMATION 110

| # | TRANSMISSION ITEM |
|---|---|
| 1 | TERMINAL ID |
| 2 | TERMINAL DATA |

STATUS INFORMATION 130

| # | TRANSMISSION ITEM |
|---|---|
| 1 | TERMINAL ID |
| 2 | ALARM INFORMATION |
| 3 | POWER SOURCE INFORMATION |
| 4 | COMMUNICATION INFORMATION (RECEPTION SIGNAL STRENGTH) |
| 5 | ATTACHMENT STATUS |
| 6 | TEMPERATURE, HUMIDITY |
| 7 | TOTAL RUNNING TIME |

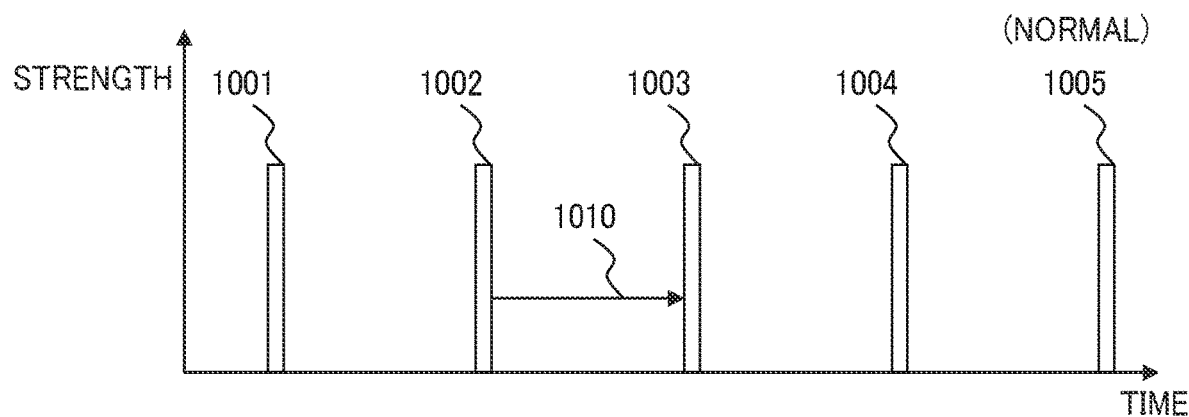
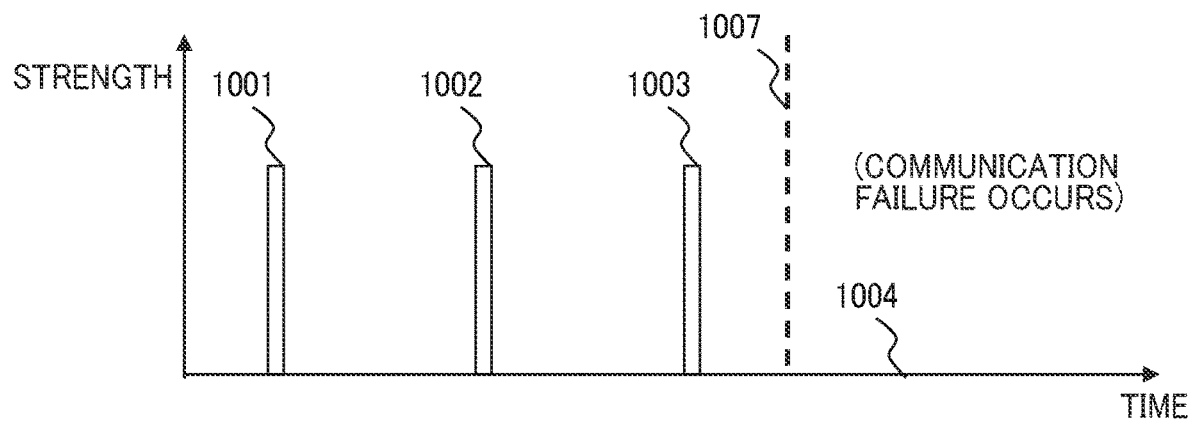
FIG. 13

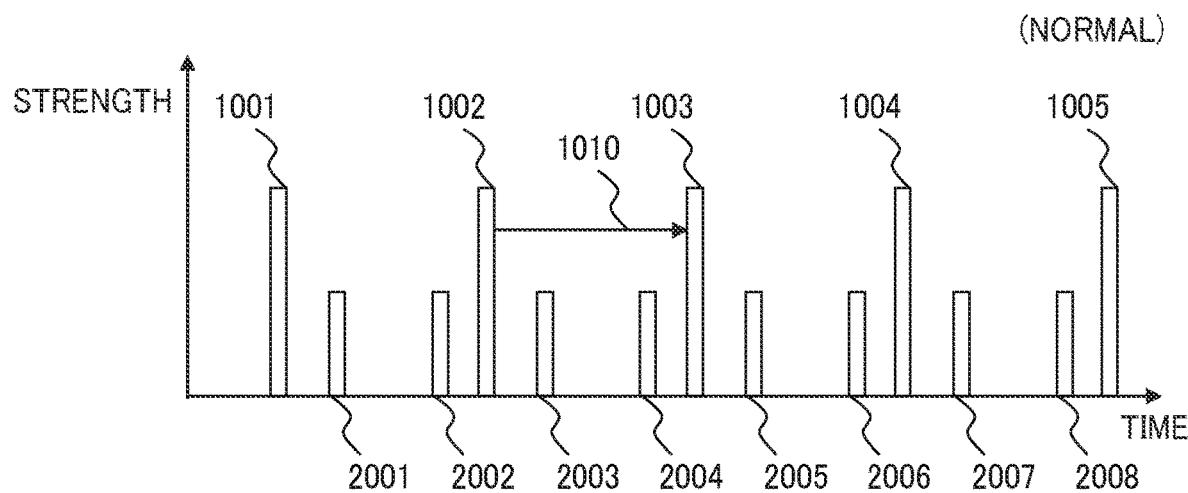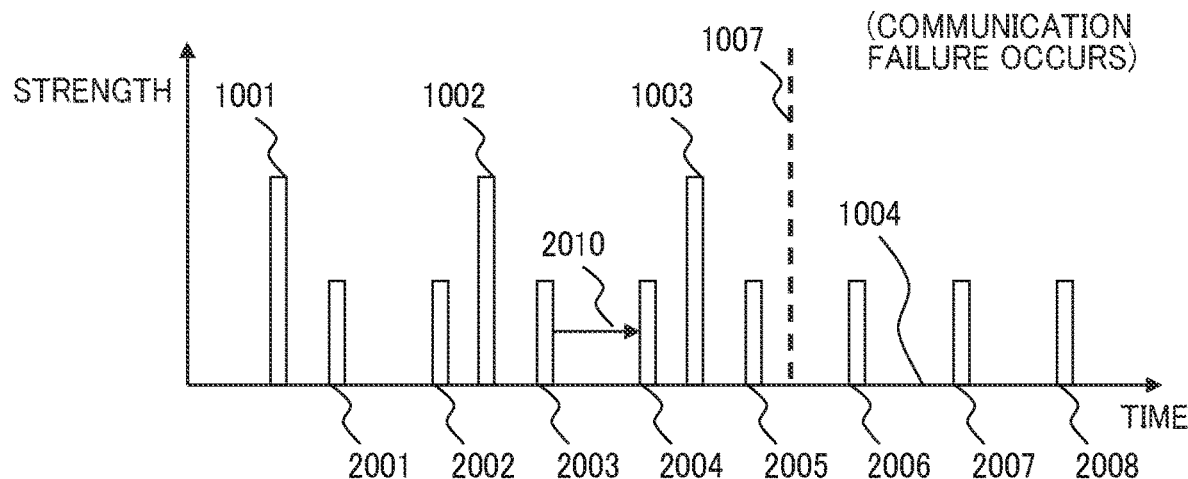
FIG. 14

COMMUNICATION SYSTEM, COMMUNICATION METHOD, AND COMMUNICATION PROGRAM

CROSS-REFERENCE TO RELATED APPLICATIONS

The present application claims priority pursuant to 35 U.S.C. § 119 from Japanese Patent Application No. 2019-49308, filed on Mar. 18, 2019, the entire disclosure of which is incorporated herein by reference.

BACKGROUND

Technical Field

The present invention relates to a communication system, a communication method, and a communication program.

Related Art

Connection of things (objects) to the Internet by an Internet of Things (IoT) system is expected to further grow in the future. Particularly, it is expected that things such as sensors will act as transmission sources of information and communication from a machine to a machine (M2M) will rapidly increase. Information from such things is spatially scattered. For example, in a large-scale factory, plant, or the like, things are scattered over a large area and a large amount of information is transmitted from these things.

When many things are arranged to be scattered spatially widely as described above, maintenance of such things consumes human resources. For example, when abnormality (communication failure or the like) such as sudden stop of providing of regularly-provided information (data) occurs, it is difficult to determine the cause of the abnormality unless a manager considers various possible causes of abnormality such as failure of a device and changes in the environment and an expert with a wide range of knowledge relating to IoT goes to the site to analyze the abnormality based on the consideration. Particularly, in the IoT system, wireless connection is introduced in many cases as means for reducing the cost of installing a network and load on human resources is a major concern.

Moreover, introduction of the IoT system is often considered to avoid complication due to dependency on skills of individuals. However, if the expertise of personnel involved in the IoT system needs be maintained even after the introduction of the IoT system, this will resultantly hinder the introduction of the IoT system. Accordingly, there is a demand for a technique which allows the cause of the communication failure or the like in the IoT system to be determined with as little human work as possible.

Cases where the communication failure occurs in the IoT system include, for example, (1) the case where a communication unit of an IoT device itself fails. In order to determine such a failure, it is conceivable to use double communication lines and perform operation with one line when the other line fails. For example, International Patent Application Publication No. WO2017/188086 discloses communication performed using multiple frequencies. Moreover, Japanese Patent Application Publication No. 2018-117180 discloses a communication terminal device which is used in a mobile communication system and which includes: a wireless communication unit capable of selectively executing communication in an Internet of Things (IoT) communication mode (normal LTE) in which IoT communication is performed between the communication terminal device and a base station and a wideband communication mode (wide area LPWA) in which wideband communication is performed between the communication terminal device and the base station in an area smaller than an IoT communication area in which communication in the IoT communication mode is possible; and a controller configured to control the wireless communication unit such that the communication terminal device performs communication with the base station while switching the communication mode between the wideband communication mode and the IoT communication mode.

SUMMARY OF THE INVENTION

However, in the IoT system, the information specific to the IoT device is exchanged. Accordingly, in the case where the double communication lines are used, both of information which can be used to analyze the communication failure and the information specific to the IoT device need to be communicated. Moreover, the cases where the communication failure occurs in the IoT system also include, in addition to the aforementioned case (1), (2) the case where a change occurs in a communication environment of the IoT system and a radio wave does not reach the reception side and (3) the case where a power source supplying power to the IoT device fails. However, a system which can appropriately handle these cases has not been sufficiently developed yet.

The present invention has been made in view of such a situation and an object thereof is to provide a communication system, a communication method, and a communication program which can appropriately infer a cause of a communication failure in a terminal.

One aspect of the present invention for solving the aforementioned problems is a communication system including: a terminal configured to perform a predetermined operation and including a processor, a memory, and a communication device configured to transmit first information relating to the predetermined operation by a first communication method; and a server apparatus configured to receive information transmitted from the terminal, wherein the communication device transmits second information indicating a status of the terminal by a second communication method different from the first communication method, and the server apparatus determines whether the first information is normally received from the terminal and, when determining that the first information is not normally received, performs predetermined processing depending on a communication status of the terminal based on the received second information.

The present invention can appropriately infer a cause of a communication failure in the terminal.

BRIEF DESCRIPTION OF THE DRAWINGS

FIG. 13 is a graph explaining an example of operation information 110 transmitted by the terminal 100 and changes in the signal strength in this transmission in the case where the terminal 100 is assumed to transmit only first information in a first communication method unlike in Embodiment 1.

FIG. 14 is a graph explaining an example of the operation information 110 transmitted by the terminal 100 according to Embodiment 1 and changes in the signal strength in this transmission.

DETAILED DESCRIPTION OF THE INVENTION

Communication systems according to embodiments are described below.

Embodiment 1

Figure 1:
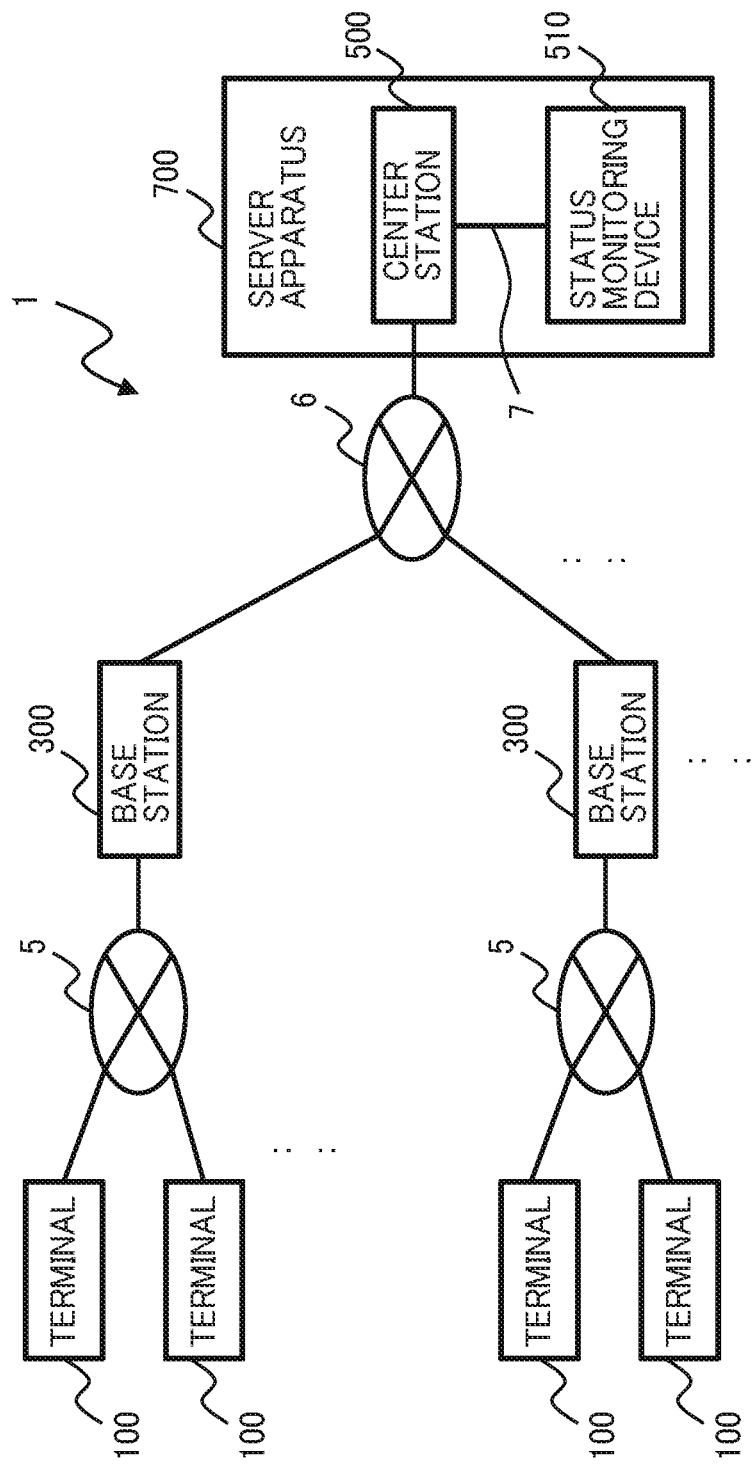
FIG. 1 is a diagram illustrating an example of a configuration of a communication system according to Embodiment 1.

FIG. 1 is a diagram illustrating an example of a configuration of a communication system according to Embodiment 1. The communication system 1 includes multiple terminals 100 which are IoT terminals, communication base stations 300, and a server apparatus 700. The communication system 1 is provided in a predetermined facility such as, for example, a large-scale factory, plant, or the like.

The terminals 100 are so-called IoT devices and may be, for example, a manufacturing device and an autonomous mobile device, as well as various devices such as an air conditioning device and a home appliance. The terminals 100 are information processing apparatuses which transmit information on operations of themselves (operation information, IoT data and the like) to the nearby communication base stations 300. Note that the terminals 100 are not necessarily at fixed locations and the positions and directions of the terminals 100 may change.

The communication base stations 300 are information processing apparatuses which transfer the information received from the terminals 100 to the server apparatus 700.

The server apparatus 700 is an apparatus used by a predetermined manager or maintenance personnel (hereafter, referred to as maintenance personnel) who performs maintenance and management of the terminals 100 in the communication system 1. The server apparatus 700 includes a center station 500 and a status monitoring device 510.

The center station 500 performs management relating to the terminals 100 based on the information received from the communication base stations 300. For example, the center station 500 analyzes the operation information (IoT data) based on the received data. Moreover, as described later, when a communication failure occurs in the communication system 1, the center station 500 infers the cause of the failure.

The status monitoring device 510 is a Business Intelligence (BI) tool which monitors communication failures in the communication system 1. For example, the status monitoring device 510 generates data of a graph to be displayed on a screen based on data generated by the center station 500 and generates control information for the communication base stations 300. Moreover, the status monitoring device 510 displays a monitor screen for monitoring the statuses of the terminals 100. For example, the maintenance personnel can grasp the communication statuses of the terminals 100 without going to the sites of the terminals 100 by referring to the monitor screen.

Note that the terminals 100 and the communication base stations 300, the communication base stations 300 and the center station 500, and the center station 500 and the status monitoring device 510 are coupled to one another by wired or wireless communication networks 5, 6, 7 such as a Local Area Network (LAN), a Wide Area Network (WAN), the Internet, and a dedicated line to be capable of communicating with one another. Note that, in this embodiment, the communication networks 5, 6 are assumed to be wireless communication networks.

Next, hardware included in each apparatus is described.

Figure 2:
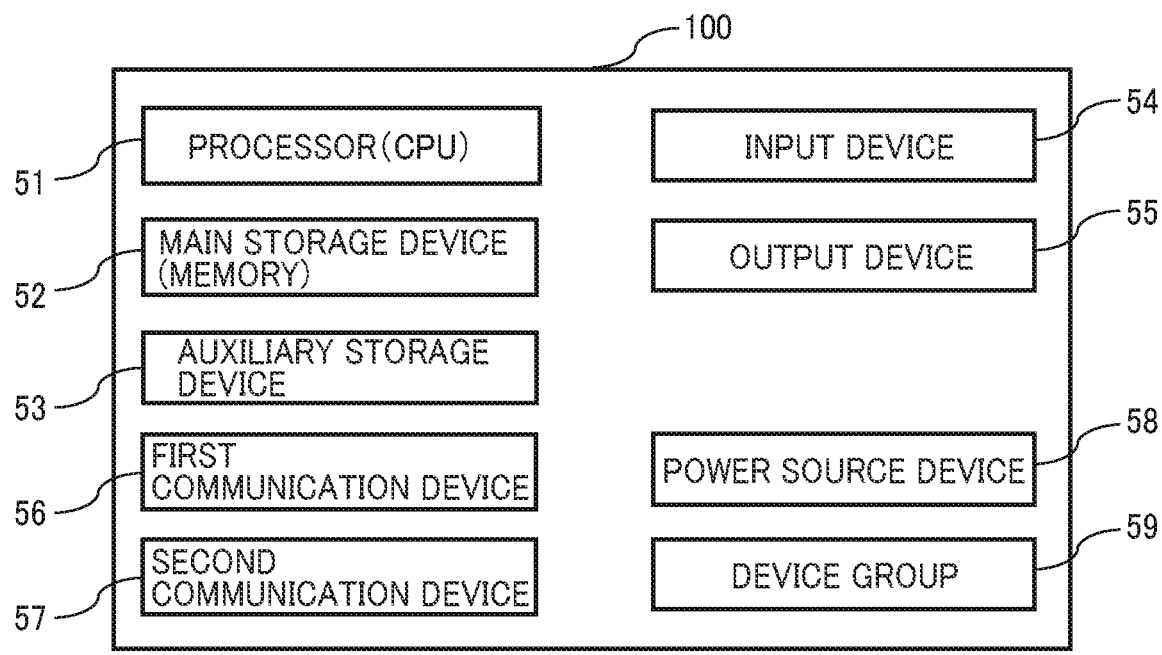
FIG. 2 is a diagram illustrating an example of a hardware configuration of a terminal 100.

FIG. 2 is a diagram illustrating an example of a hardware configuration of each terminal 100. Each information processing apparatus includes a processor 51 such as a Central Processing Unit (CPU), a main storage device 52 such as a Random Access Memory (RAM) and a Read Only Memory (ROM), an auxiliary storage device 53 such as a Hard Disk Drive (HDD) and a Solid State Drive (SSD), an input device 54 such as a keyboard, a mouse, and a touch panel, an output device 55 such as a monitor (display) which performs screen display, a first communication device 56, a second communication device 57, a power source device 58, and a device group 59.

The first communication device 56 transmits and receives information (operation information. Hereafter, also referred to as first information) relating to the operation of the terminal 100. The operation information is transmitted to the server apparatus 700 via a corresponding one of the communication base stations 300. Note that, as described later, the first communication device 56 transmits the first information by a predetermined communication method (hereafter, referred to as first communication method). The server apparatus 700 performs various types of analysis on the terminal 100 by using this first information and transmits predetermined information to the terminal 100.

The second communication device 57 transmits and receives information (hereafter, referred to as status information or second information) on statuses of the terminal 100 (for example, statues of hardware such as the first communication device 56, the second communication device 57, the power source device 58, and the device group 59 and statues of an environment around the terminal 100). The status information is transmitted to the server apparatus 700 via the corresponding communication base station 300. Note that, as described later, the first communication device 56 transmits the second information by another predetermined communication method (hereafter, also referred to as second communication method).

The device group 59 is hardware (parts) such as a sensor device and a control device which perform operations as IoT devices.

Figure 3:
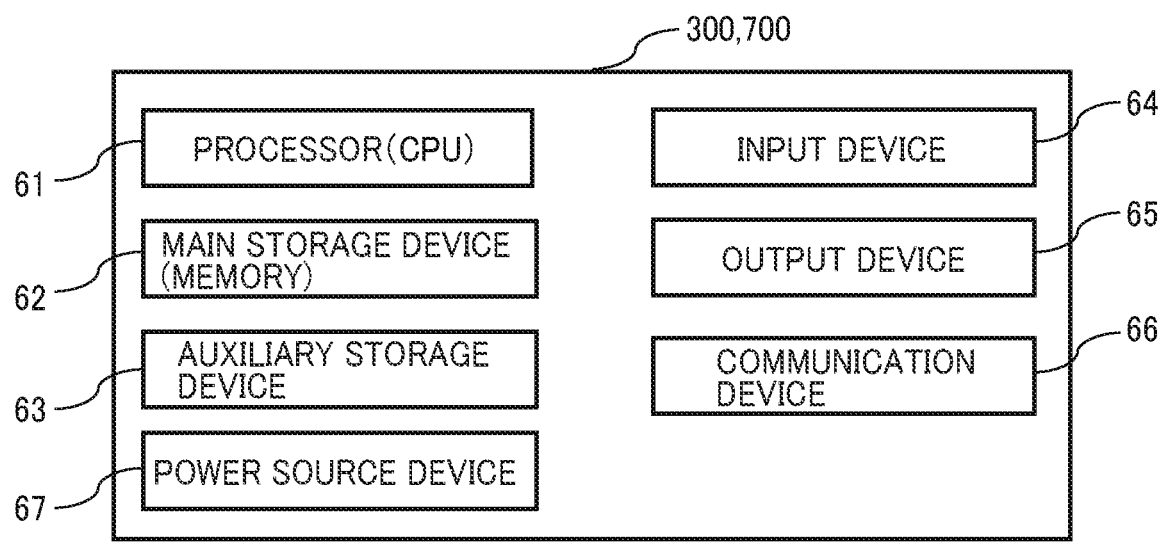
FIG. 3 is a diagram illustrating an example of a hardware configuration of a communication base station 300 and a server apparatus 700.

FIG. 3 is a view illustrating an example of a hardware configuration of each of the communication base stations 300 and the server apparatus 700. Each information processing apparatus includes a processor 61 such as a Central Processing Unit (CPU), a main storage device 62 such as a Random Access Memory (RAM) and a Read Only Memory (ROM), an auxiliary storage device 63 such as a Hard Disk Drive (HDD) and a Solid State Drive (SSD), an input device 64 such as a keyboard, a mouse, and a touch panel, an output device 65 such as a monitor (display) or the like which performs screen display, a communication device 66, and a power source device 67. Note that the communication base station 300 may not include the input device 64 or the output device 65.

<<Functions>>

Next, functions of each terminal 100 are described.

<Terminal>

Figure 4:
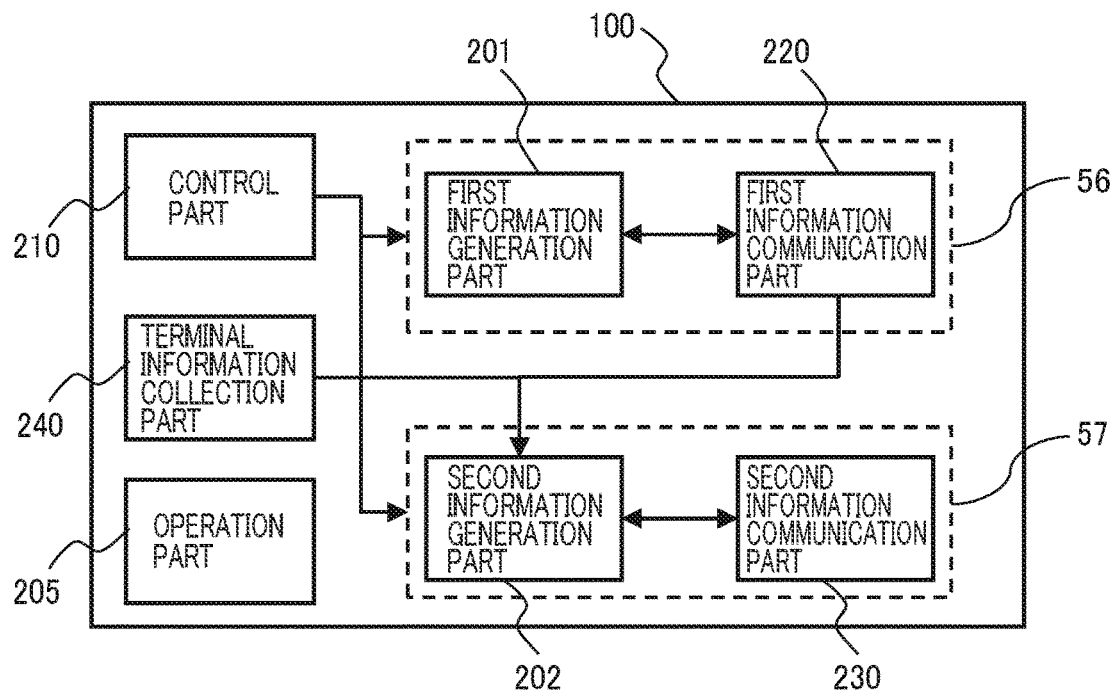
FIG. 4 is a diagram illustrating an example of functions of the terminal 100.

FIG. 4 is a diagram illustrating an example of the functions of the terminal 100. The terminal 100 includes functions of an operation part 205, a control part 210, a terminal information collection part 240, a first information generation part 201, a second information generation part 202, a first information communication part 220, and a second information communication part 230.

The operation part 205 operates devices in the terminal 100.

The control part 210 switches the communication between the communication in the first communication method and the communication in the second communication method.

The first information generation part 201 generates the first information (operation information).

The first information communication part 220 transmits the first information (operation information) generated by the first information generation part 201, in the first communication method. Note that, in the embodiment, the first information communication part 220 is assumed to transmit the operation information in a predetermined cycle (hereafter, referred to as first cycle).

The terminal information collection part 240 obtains the information (terminal information) outputted by the various devices such as the first communication device 56, the second communication device 57, the power source device 58, the device group 59, or the like.

The second information generation part 202 generates the second information (status information) based on the terminal information collected by the terminal information collection part 240. The status information is, for example, alarm information relating to the devices of the terminal 100, power source information relating to a current status of the power source device 58 of the terminal 100 (for example, information on voltage, current, and the like), and information (base station information) on reception strength of a radio wave from the corresponding communication base station 300. Details of the status information are described later.

The second information communication part 230 transmits the second information (terminal information) indicating the statuses of the terminal 100, in the second communication method different from the first communication method. Note that the potential propagation distance of the radio wave in the second communication method is longer than that in the first communication method.

Note that, in the embodiment, the second communication method is assumed to be a communication method which consumes less energy (power) than the first communication method.

Moreover, in the embodiment, a cycle of transmission of the second information in the second communication method (hereafter, referred to as second cycle) is assumed to be shorter than the cycle of the transmission of the first information (operation information) in the first communication method (first cycle).

Details of the first communication method and the second communication method are described.

(First Communication Method and Second Communication Method)

Figure 5:
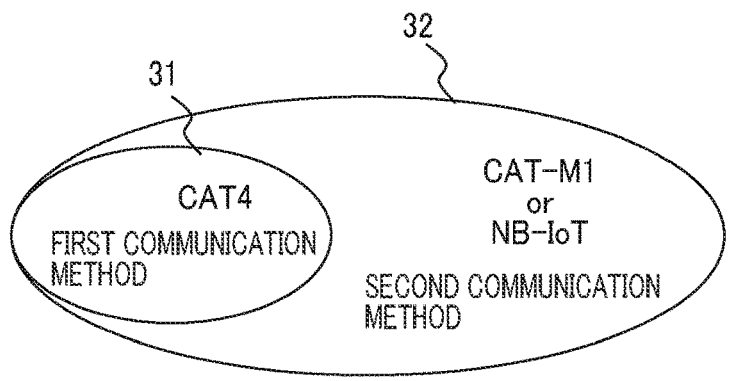
FIG. 5 is a diagram explaining an example of a combination of a first communication method and a second communication method.

FIG. 5 is a diagram explaining an example of a combination of the first communication method and the second communication method. In the example, a first communication method 31 is a communication method with a wide communication wave band and is specifically Long Term Evolution (LTE) specified by 3GPP which is a standardizing body. The specification of the terminal 100 in this case is category 4 (CAT-4) or the like. Moreover, a second communication method 32 is LPWA. The specification of the terminal 100 in this case is category M1 (CAT-M1) or NB-IoT. Since the signal strength per bit in category M1 (CAT-M1) and NB-IoT is greater than that in CAT-4, the propagation distance of the radio wave in the second communication method 32 is longer than that in the first communication method 31 (cover area is larger), although the transmission efficiency (spectral efficiency) of data in the second communication method 32 is lower than that in the first communication method 31.

Note that, in this case, since both of the first communication method 31 and the second communication method 32 comply with the LTE standards, the same communication base station 300 can transmit and receive data by both communication methods and processing load in the communication system 1 can be reduced.

Figure 6:
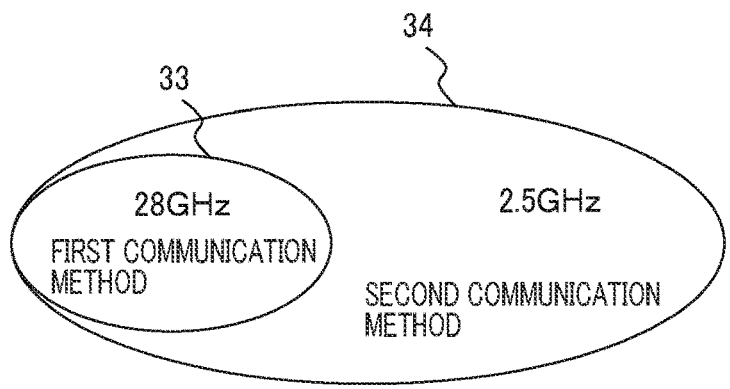
FIG. 6 is a diagram explaining another example of the combination of the first communication method and the second communication method.

FIG. 6 is a diagram explaining another example of the combination of the first communication method and the second communication method. In this example, a first communication method 33 and a second communication method 34 are both LPWA. Moreover, a radio wave with a higher frequency (for example, 28 GHz) is transmitted and received in the first communication method 33 and a radio wave with a lower frequency (for example, 2.5 GHz) is transmitted and received in the second communication method 34. In such a combination, due to straightness and propagation loss of each radio wave, the cover area of the second communication method 34 using the radio wave with lower frequency is larger than that of the first communication method 33, although the transmission amount of the information in the second communication method 34 is smaller than that in the first communication method 33. Note that, although both communication methods are described to be LPWA in this case for the sake of explanation, the main purport of the explanation is the same also for other methods such as, for example, CAT-4.

As described in the aforementioned examples, utilizing the difference in the propagation distance of the radio wave and the difference in the amount of information transmittable per unit time allows the second information (status information) on the status of the terminal 100 to reach the communication base station 300 with high probability even in a situation where the first information (operation information) which is information specific to the IoT device does not reach the communication base station 300.

Accordingly, it is desirable that the potential propagation distance of the radio wave in the second communication method is longer than the potential propagation distance in the first communication method. This allows the server apparatus 700 at a remote location to more surely grasp a defect occurring in the terminal 100 and determine the cause of this defect.

Next, the operation information and the status information are described.

(Operation Information)

Figures 7, 8, 9:
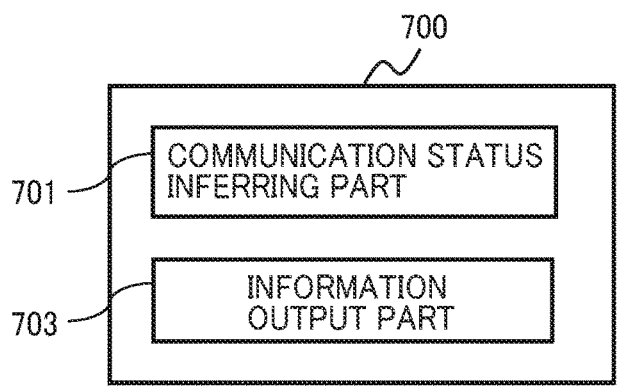
FIG. 7 is a diagram illustrating an example of operation information.
FIG. 8 is a diagram illustrating an example of status information.
FIG. 9 is a diagram explaining an example of functions of the server apparatus 700.

FIG. 7 is a diagram illustrating an example of the operation information. The operation information 110 includes pieces of information including a terminal ID 111 which is an identifier of the terminal 100 and terminal data 112 which is analyzed by the server apparatus 700 and which is information on operations of the terminal 100 relating to the terminal ID 111. Since the terminal data 112 generally includes a large amount of information, the size of the operation information 110 tends to be large.

(Status Information)

FIG. 8 is a diagram illustrating an example of the status information. The status information 130 includes a terminal ID 131 which is the identifier of the terminal 100, alarm information 132, power source information 133, communication information 134, attachment status information 135, temperature-humidity information 136, and total running time information 137.

The alarm information 132 is, for example, information on whether the devices forming the terminal 100 are normally running (for example, information indicating running statuses of the respective devices obtained from a predetermined monitoring device in the terminal 100).

Note that the alarm information 132 may be stored in the auxiliary storage device 53 with low power consumption (for example, a memory such as a flash memory). The second communication device 57 can thereby transmit the alarm information 132 stored in the auxiliary storage device 53 to the communication base station 300 even when, for example, the power supply performance of the power source device 58 in the terminal 100 decreases. Specifically, since the second communication device 57 employs the second communication method with lower energy consumption (power consumption) than the first communication method, the second communication device 57 can transmit the status of the terminal 100 (for example, the power source information 133 relating to the power source device 58) to the communication base station 300.

The power source information 133 is information indicating the status (for example, the voltage and current) of the power source device 58 in the terminal 100. The communication information 134 is information on the reception strengths of signals which the terminal 100 has received from the currently-communicating communication base station 300 (specifically, a signal received in the first communication method and a signal received in the second communication method) and signals which the terminal 100 has received from another communication base station 300.

The attachment status information 135 is information indicating an attachment status of the terminal 100 and is, for example, measurement values obtained from a vibration sensor, a direction sensor, an acceleration sensor, a position sensor, and the like provided in the terminal 100. The attachment status information 135 is a parameter provided because the terminal 100 does not normally operate when the attachment status of the terminal 100 changes.

The temperature-humidity information 136 is information on the temperature and humidity of the terminal 100 obtained from a temperature sensor and the like provided in the terminal 100. The temperature-humidity information 136 is a parameter provided because the devices of the terminal 100 have drastically shorter life or do not normally operate by being affected by environmental statuses such as temperature and humidity.

The total running time information 137 is information on total running time stored in the terminal 100. The total running time information 137 is a parameter which the maintenance personnel can use to check the timing of maintenance and the like based on the running time of the terminal 100.

Note that the status information 130 described herein is merely an example and may include other pieces of information indicating the status of the terminal 100. Moreover, the status information 130 may only include some of the aforementioned pieces of information.

Next, the functions of the server apparatus 700 are described.

<Server Apparatus>

FIG. 9 is a diagram explaining an example of the functions of the server apparatus 700. The server apparatus 700 includes a communication status inferring part 701 and an information output part 703.

The communication status inferring part 701 determines whether the first information (operation information 110) is normally received from the terminal 100. When determining that the first information is not normally received, the communication status inferring part 701 performs a predetermined process depending on the communication status of the terminal 100 based on the received second information (status information 130).

When the communication status inferring part 701 determines that the first information (operation information 110) is not normally received, the information output part 703 determines whether there is abnormality in the communication status of the terminal 100 based on the received second information (status information 130). When determining that there is abnormality in the communication status, the information output part 703 outputs information indicating this abnormality.

The functions of the information processing apparatuses in the communication system 1 described above are implemented by the hardware of these information processing apparatuses such that the processors of these apparatuses read and execute programs stored in the storage device or the auxiliary storage device.

Moreover, these programs are stored in, for example, a storage device such as a secondary storage device, a nonvolatile semiconductor memory, a hard disk drive, or SSD or a non-temporary data recording medium such as an IC card, an SD card, or a DVD which can be read by the information processing apparatuses.

<<Processes>>

Next, processes performed by the communication system 1 are described. First, the communication system 1 executes an operation information transmission process in which the terminal 100 transmits the operation information 110 and a status information transmission process in which the terminal 100 transmits the status information 130. Note that these processes are executed independently.

<Operation Information Transmission Process>

Figure 10:
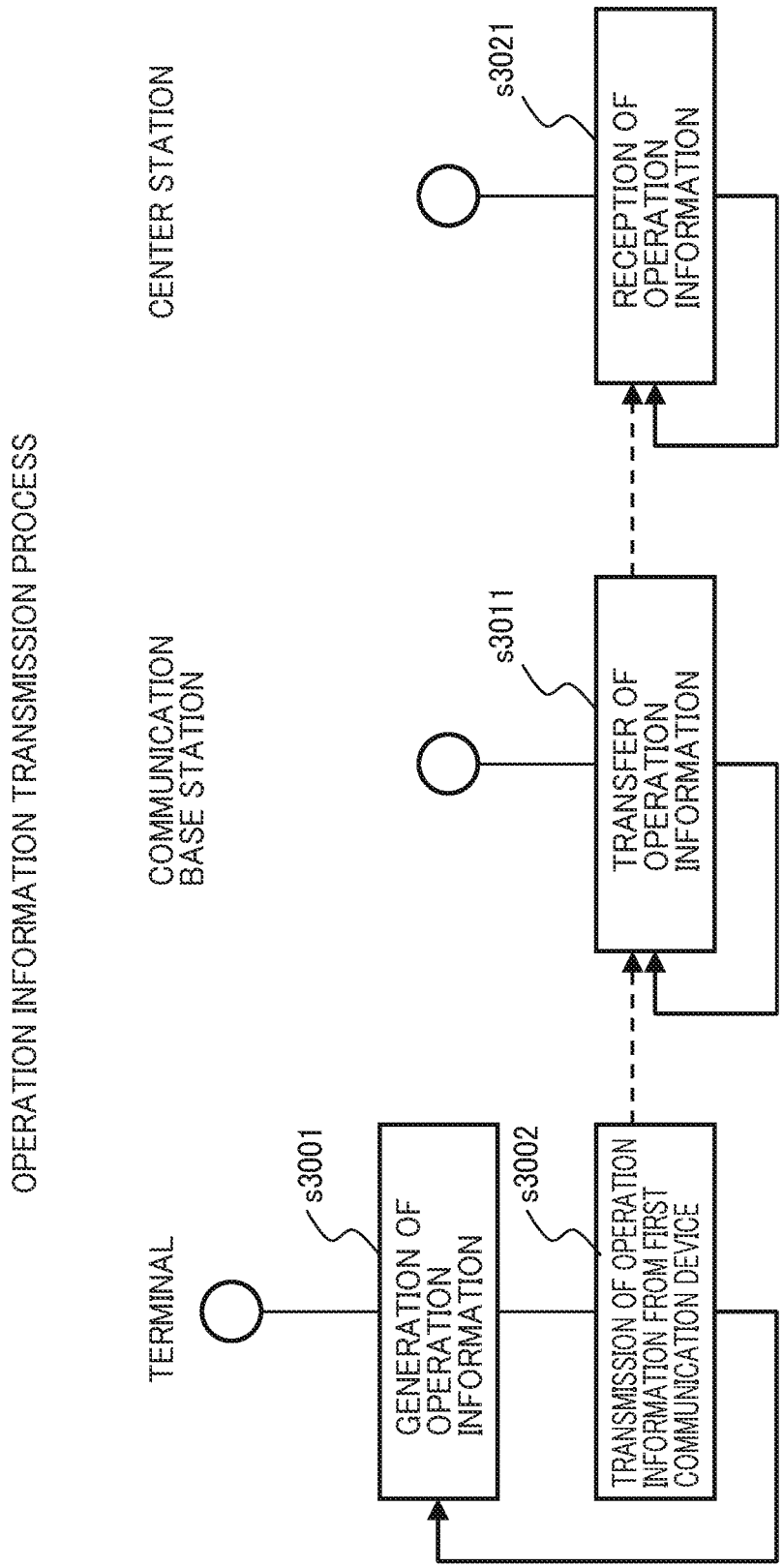
FIG. 10 is a flowchart explaining an example of an operation information transmission process.

FIG. 10 is a flowchart explaining an example of the operation information transmission process. The operation information transmission process is started, for example, when the power source device 58 of the terminal 100 is activated.

The terminal 100 generates the operation information 110 (s3001). Specifically, for example, the terminal 100 generates the operation information 110 based on information outputted by the device group 59. Then, the terminal 100 (first communication device 56) transmits the operation information 110 generated in s3001 to the communication base station 300 (s3002). The terminal 100 repeats the aforementioned process in the first cycle. However, there is a case where the terminal 100 cannot transmit the operation information 110 to the communication base station 300 due to some kind of communication failure.

The communication base station 300 transfers the operation information 110 transmitted from the terminal 100 to the center station 500 (s3011) and the center station 500 receives and stores the operation information 110 transmitted from the communication base station 300 (s3021).

<Status Information Transmission Process>

Figure 11:
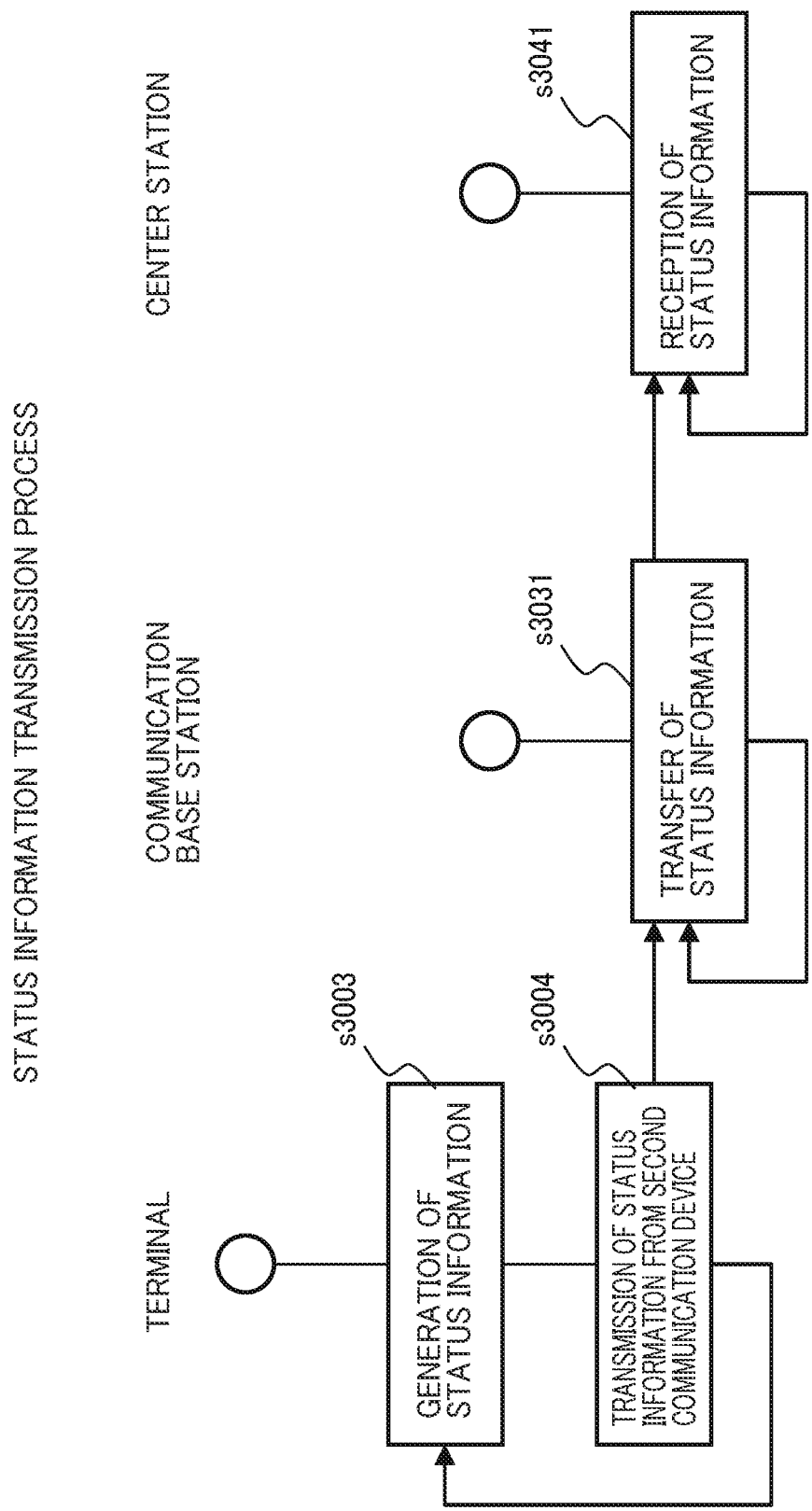
FIG. 11 is a flowchart explaining an example of a status information transmission process.

FIG. 11 is a flowchart explaining an example of the status information transmission process. The status information transmission process is started, for example, when the power source device 58 of the terminal 100 is activated.

The terminal 100 generates the status information 130 (s3003). Specifically, for example, the terminal 100 generates the status information 130 based on the terminal information. Then, the terminal 100 (second communication device 57) transmits the status information 130 generated in s3003 to the communication base station 300 (s3004). The terminal 100 repeats the aforementioned process in the second cycle. In the embodiment, the second cycle in the status information transmission process is shorter than the first cycle in the operation information transmission process. Accordingly, the status information 130 is more frequently transmitted to the communication base station 300.

The communication base station 300 transfers the status information 130 transmitted from the terminal 100 to the center station 500 (s3031) and the center station 500 receives the status information 130 transmitted from the communication base station 300 (s3041).

Note that, since the propagation distance of the second information is longer than that of the first information, the possibility that the terminal 100 cannot transmit the second information to the communication base station 300 is low.

Next, in the communication system 1, the server apparatus 700 executes a communication status display process of displaying the current communication status of the terminal 100.

<Communication Status Display Process>

Figure 12:
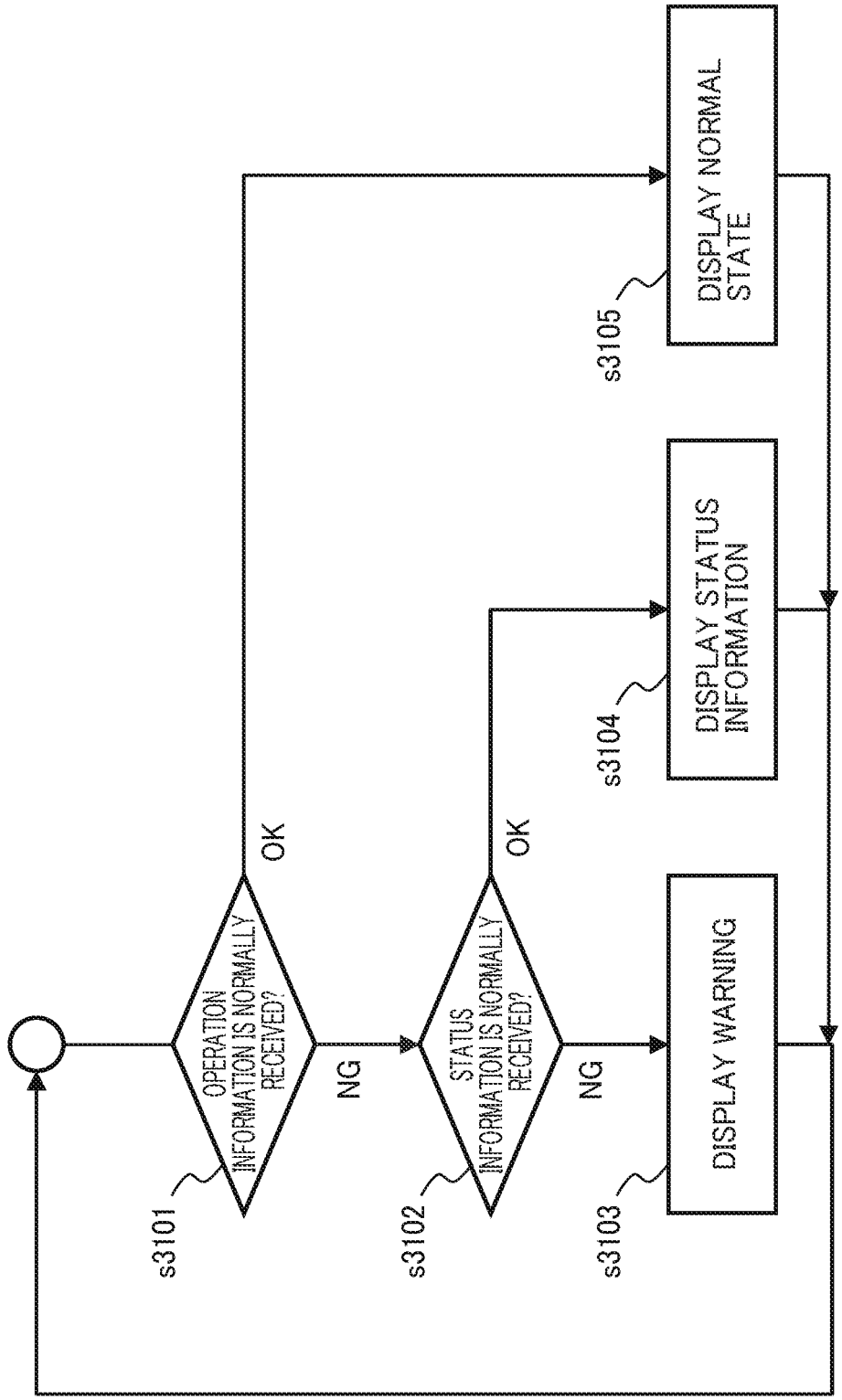
FIG. 12 is a flowchart explaining an example of a communication status display process.

FIG. 12 is a flowchart explaining an example of the communication status display process. The communication status display process is started, for example, when the server apparatus 700 is activated.

The center station 500 determines whether the operation information 110 is being normally received (for example, received in the first cycle) from each terminal 100 (hereafter, referred to as target terminal) in the communication system 1 (s3101). When the center station 500 is normally receiving the operation information 110 from the target terminal (s3101: OK), a process of s3105 is performed. When the center station 500 is not normally receiving the operation information 110 from the target terminal (s3101: NG), a process of s3102 is performed.

In s3105, the status monitoring device 510 displays that the communication status of the terminal 100 is normal. Thereafter, the processes of s3101 and beyond are repeated.

In s3102, the center station 500 determines whether the status information 130 is being normally received (for example, received in the second cycle) from the target terminal. When the center station 500 is not normally receiving the status information 130 from the target terminal (s3102: NG), the status monitoring device 510 displays a predetermined screen warning that the communication by the terminal 100 is abnormal as a whole (s3103). Thereafter, the processes of s3101 and beyond are repeated.

Meanwhile, when the center station 500 is normally receiving the status information 130 from the target terminal (s3102: OK), the status monitoring device 510 displays the contents of the status information 130 on a predetermined screen (s3104). The maintenance personnel can infer the reason of the communication failure of the terminal 100 by referring to this screen. Thereafter, the processes of s3101 and beyond are repeated.

As described above, in the communication system 1 of the embodiment, the communication device of the terminal 100 transmits the second information (status information 130), indicating the status of the terminal 100, in the second communication method different from the first communication method for the first information (operation information 110) and, when the server apparatus 700 determines that the first information (operation information 110) is not normally received from the terminal 100, the server apparatus 700 performs the predetermined process depending on the communication status of the terminal 100 based on the received second information. Accordingly, even when a communication failure in which the server apparatus 700 cannot receive the operation information 110 of the terminal 100 occurs, an appropriate process depending on the communication status can be performed based on the separately-received status information 130.

As described above, in the communication system 1 of the embodiment, the cause of the communication failure of the terminal 100 can be appropriately inferred. For example, a maintenance personnel with a wide range of knowledge on the communication system 1 can recover the communication status of the communication system 1 without going to the site and analyzing the communication status or with the analysis simplified. In other words, a defect in communication occurring on the terminal 100 side due to some reason can be grasped on the server apparatus 700 side at a remote location.

Next, characteristics of the communication system 1 in the aforementioned embodiment are described.

FIG. 13 is a graph explaining an example of the operation information 110 transmitted by the terminal 100 and changes in the signal strength in this transmission in the case where the terminal 100 is assumed to transmit only the first information in the first communication method unlike in Embodiment 1. In each graph of FIG. 13, the horizontal axis represents time and the vertical axis represents the strength of the signal relating to the operation information 110. When the terminal 100 is normally operating, the signals 1001 to 1005 relating to the operation information 110 are transmitted at constant time intervals 1010.

Meanwhile, when a failure occurs in the communication of the terminal 100, the signals 1004 to 1005 relating to the operation information 110 after a certain timing 1007 are not transmitted. The center station 500 thereby cannot detect the operation information 110 transmitted from the first communication device 56. Accordingly, the maintenance personnel can infer that some kind of defect relating to the communication has occurred but cannot infer the cause of this defect. For example, since the maintenance personnel cannot determine whether this failure is caused by the terminal 100 or an environment other than the terminal 100, a personnel needs to be sent to the site to analyze the failure.

Meanwhile, FIG. 14 is a graph explaining an example of the operation information 110 transmitted by the terminal 100 according to Embodiment 1 and changes in the signal strength in this transmission. When the terminal 100 is normally operating, as in FIG. 13, the signals 1001 to 1005 relating to the operation information 110 are transmitted at constant time intervals 1010. Then, when a failure occurs in the communication of the terminal 100, as in FIG. 13, the signals 1004 to 1005 relating to the operation information 110 are not transmitted from the first communication device 56 after the certain timing 1007.

However, in the embodiment, the second communication device 57 of the terminal 100 is continuously transmitting the signals 2001 to 2008 relating to the status information 130 in the second communication method at the predetermined strength, at time intervals 2020 shorter than the time intervals 1010 of the transmission in the first communication method, before and after the occurrence of the failure in the communication of the terminal 100. The maintenance personnel can thereby determine the cause of the communication failure by referring to the contents of the status information 130 from the second communication device 57.

Particularly, in the embodiment, the second communication method (for example, LPWA) is the communication method in which communication can be achieved with very small power supply (for example, the second communication device 57 can be driven by a battery). Moreover, the propagation distance of the radio wave in the second communication method is longer than that in the first communication method. Accordingly, when the communication failure occurring in the terminal 100 is due to a serious cause to communication such as an increase in propagation loss or a defect in a power source, the status information 130 from the second communication device 57 is continuously transferred to the server apparatus 700 even after the occurrence of the failure in the communication of the terminal 100 (reference numerals 2006 to 2008).

Embodiment 2

Next, in a communication system 1 according to Embodiment 2, the communication base stations 300 perform control depending on instructions from the server apparatus 700.

Figure 15:
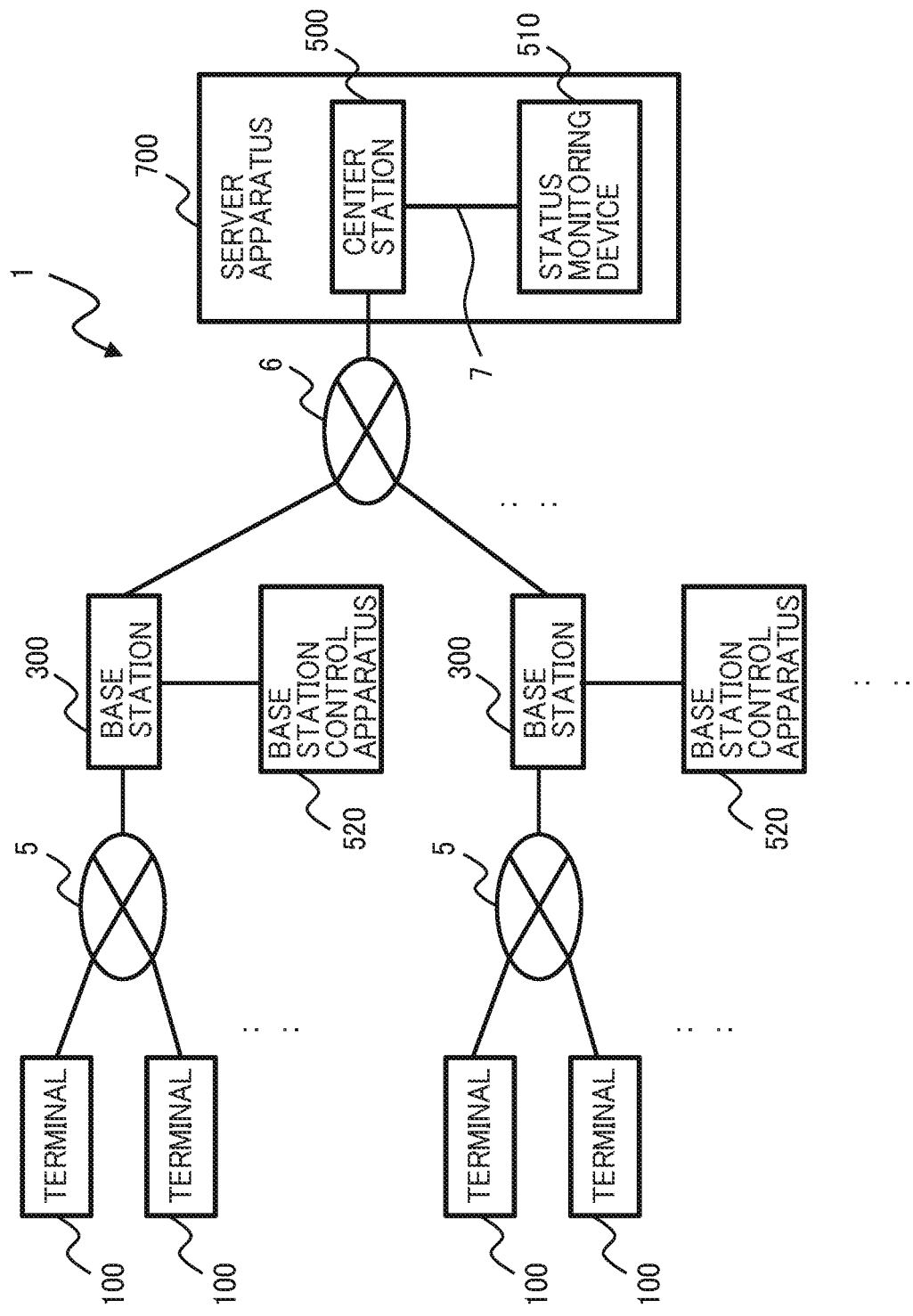
FIG. 15 is a diagram illustrating an example of a configuration of the communication system 1 according to Embodiment 2.

FIG. 15 is a diagram illustrating an example of a configuration of the communication system 1 according to Embodiment 2. The communication system 1 of the embodiment further includes base station control apparatuses 520 which perform communication control on the respective communication base stations 300. The hardware configuration of the base station control apparatuses 520 is the same as that of the communication base stations 300. Note that each base station control apparatus 520 may be configured to be integral with the corresponding communication base station 300.

The base station control apparatus 520 has the following function: when determining that the first information (operation information 110) is not normally received from the base station (communication base station 300), the base station control apparatus 520 determines whether the cause of the abnormality in the communication of the terminal 100 is in the base station based on the received second information (status information 130); and when determining that the cause of the abnormality in the communication of the terminal 100 is in the base station, the base station control apparatus 520 transmits predetermined control information to the base station.

For example, the base station control apparatus 520 has the following function: when determining that the first information (operation information 110) is not normally received from the terminal 100, the base station control apparatus 520 determines whether the cause of the abnormality in the communication of the terminal 100 is in the base station (communication base station 300) by determining whether the reception strengths of the radio waves received by the terminal 100 in the first communication method and the second communication method are lower than predetermined thresholds, the reception strengths being information (communication information 134) indicated in the received second information (status information 130); and when determining that the reception strengths of the radio waves received by the terminal 100 in the first communication method and the second communication method are lower than the predetermined thresholds, the base station control apparatus 520 transmits, to the base station, control information which adjusts transmission outputs of the radio waves or a directivity of an antenna.

Moreover, for example, the base station control apparatus 520 has the following function: when determining that the first information (operation information 110) is not normally received from the terminal 100, the base station control apparatus 520 determines whether there is abnormality in the communication status of the terminal 100 by determining whether the reception strengths of the radio waves received by the terminal 100 in the first communication method and the second communication method are higher than predetermined thresholds, the reception strengths being information (communication information 134) indicated in the received second information (status information 130); and when determining that the reception strengths of the radio waves received by the terminal 100 in the first communication method and the second communication method are higher than the predetermined thresholds, the base station control apparatus 520 outputs information indicating that there is abnormality in the information transmission by the terminal 100.

Furthermore, for example, the base station control apparatus 520 has the following function: when the base station control apparatus 520 determines that the first information (operation information 110) is not normally received from the terminal 100 and determines that the reception strength of the radio wave received by the terminal 100 in the first communication method is lower than a predetermined threshold and the reception strength of the radio wave received by the terminal 100 in the second communication method is higher than a predetermined threshold, the base station control apparatus 520 outputs information indicating that a failure has occurred in the communication of the terminal 100 in the first communication method, the reception strengths being information (communication information 134) indicated in the received second information (status information 130).

Moreover, for example, the base station control apparatus 520 has the following function: when determining that the first information (operation information 110) is normally received from the terminal 100, the base station control apparatus 520 determines whether the reception of the first information in a predetermined period before and after the determination is stable; and when determining that the reception of the first information is unstable, the base station control apparatus 520 transmits, to the base station, a control signal indicating that the first information is to be transmitted with a channel used for the transmission and reception of the first information changed to new divided channels.

Next, the communication status display process according to the embodiment is described.

<Communication Status Display Process>

Figure 16:
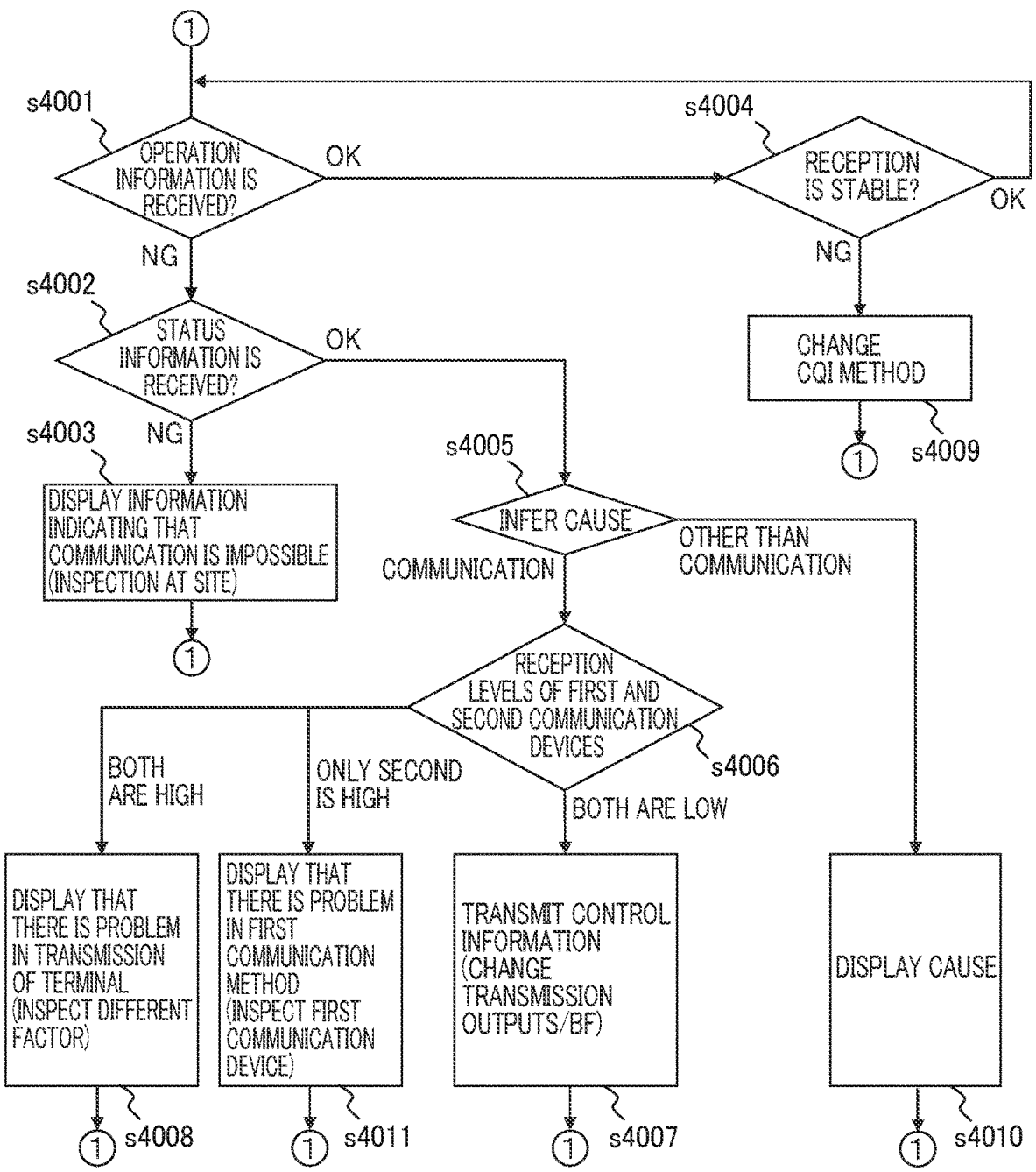
FIG. 16 is a flowchart explaining an example of the communication status display process according to Embodiment 2.

FIG. 16 is a flowchart explaining an example of the communication status display process according to Embodiment 2. First, as in Embodiment 1, the center station 500 determines whether the operation information 110 is being normally received from each terminal 100 (target terminal) in the communication system 1 (s4001). When the center station 500 is normally receiving the operation information 110 from the target terminal (s4001: OK), a process of s4004 is performed. When the center station 500 is not normally receiving the operation information 110 from the target terminal (s4001: NG), a process of s4002 is performed.

In s4002, as in Embodiment 1, the center station 500 determines whether the status information 130 is normally received from the target terminal. When the center station 500 is not normally receiving the status information 130 from the target terminal (s4002:NG), the center station 500 displays information indicating that the terminal 100 is unable to perform communication, on a predetermined screen (s4003). Thereafter, the processes of s4001 and beyond are repeated. Note that, in this case, the maintenance personnel go to the site of the target terminal and perform inspection or the like.

Meanwhile, when the center station 500 is normally receiving the status information 130 from the target terminal (s4002: OK), the center station 500 infers the cause of non-reception of the operation information 110 from the status information 130 (s4005).

Specifically, for example, the center station 500 refers to each piece of information in the status information 130 and determines whether the piece of information indicates an abnormal state. When the information indicating the abnormal state is the communication information 134 (s4005: communication), the center station 500 determines that the cause of the non-reception of the operation information 110 is a factor relating to communication and performs a process of s4006.

Meanwhile, when the information indicating the abnormal state is information other than the communication information 134 (s4005: other than communication), the status monitoring device 510 determines that the cause of the non-reception of the operation information 110 is hardware relating to this information and displays information indicating this cause on a predetermined screen (s4010). Thereafter, the processes of s4001 and beyond are repeated. Note that, in this case, the maintenance personnel can determine that a part corresponding to the displayed screen has failed and go to the site of the target terminal to appropriately replace the part or the terminal.

In s4006, the center station 500 checks whether the reception level of the signal received by each of the first communication device 56 and the second communication device 57 in the terminal 100 is high based on the communication information 134 in the status information 130. Specifically, for example, the center station 500 determines whether the reception level of each of the first communication device 56 and the second communication device 57 is continuously high (whether the reception level is higher than a predetermined threshold) in a predetermined period before and after the latest determination in s4005.

When the reception levels of the first communication device 56 and the second communication device 57 are high (s4006: both are high), the status monitoring device 510 displays information indicating that there is a defect in the communication relating to the transmission of the terminal 100 as a whole (s4008). This is because it is assumed that, when the reception levels of the terminal 100 are high, the signals from the communication base station 300 are normally reaching the terminal 100 but the signals from the terminal 100 are not normally reaching the communication base station 300. Thereafter, the processes of s4001 and beyond are repeated.

Moreover, when the reception level of the first communication device 56 is continuously low but the reception level of the second communication device 57 is continuously high or does not change greatly (for example, the width of change in the reception level over time does not exceed a predetermined value) (s4006: only the second is high), the status monitoring device 510 displays a screen indicating that there is a defect in the communication of the terminal 100 in the first communication method (first communication device 56) (s4011). Thereafter, the processes of s4001 and beyond are repeated. Note that, in this case, the maintenance personnel, for example, prepare extra parts corresponding to the first communication device 56 and perform investigation at the site.

When the reception levels of the radio waves received by the first communication device 56 and the second communication device 57 are low (s4006, both are low), the center station 500 transmits predetermined control information to the base station control apparatus 520 (s4007) and the communication base station 300 performs predetermined control corresponding to the control information received via the base station control apparatus 520. Thereafter, the processes of s4001 and beyond are repeated.

Specifically, for example, the center station 500 transmits control information which increases transmission output or control information which changes the directivity of the antenna, to the base station control apparatus 520 corresponding to the communication base station 300 or the like which has transmitted the status information 130. For example, the center station 500 transmits, to the base station control apparatus 520, control information which changes parameters relating to combining weight of an antenna array such that the radio waves are transmitted in a direction in which the terminal 100 is present, the antenna array being a group of multiple antennas included in the communication base station 300. This is because, when the overall reception levels of the signals received by the terminal 100 are low, changes in the external environment other than the terminal 100 are assumed to be causing a decrease in gain of the propagation channels of the radio waves. The reception levels of the signals received by the terminal 100 can be thereby improved.

In s4004, the center station 500 determines whether the reception of the operation information 110 is stable. Specifically, for example, the center station 500 receives the operation information 110 multiple times within a predetermined period and determines whether the reception is stable based on changes in the quality of the radio wave in each reception (for example, the signal strength and the number of times of occurrence or frequency of retransmission relating to an error).

When the reception of the operation information 110 is stable (s4004: OK), the processes of s4001 and beyond are repeated. Meanwhile, when the reception of the operation information 110 is unstable (s4004: NG), the center station 500 transmits, to the base station control apparatus 520, a control signal which changes a CQI method set as a propagation channel inferring method in the communication of the terminal 100 to a sub-channel CQI method (s4009). Thereafter, the processes of s4001 and beyond are repeated.

Next, channel control in s4009 is described.

Figure 17:
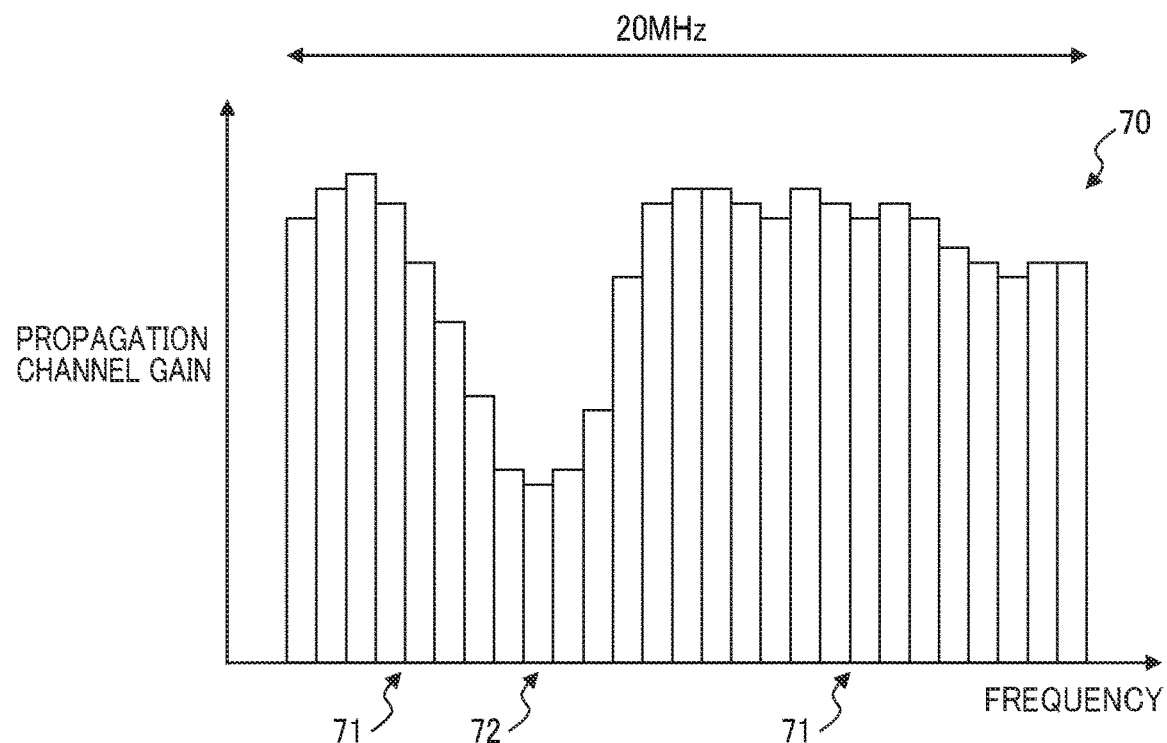
FIG. 17 is a graph illustrating an example of characteristics of a channel.

FIG. 17 is a graph illustrating an example of characteristics of a channel. In FIG. 17, the horizontal axis represents frequency (for example, frequencies around 20 MHz in the case of LTE) and the vertical axis represents propagation channel gain. Note that the channel refers to gain of a propagation channel in a radio propagation channel from a transmission antenna to a reception antenna.

A channel 70 illustrated in FIG. 17 includes frequencies 71 with high propagation channel gain (high values in the vertical axis) and frequencies 72 with low propagation channel gain (low values in the vertical axis) and the propagation channel gain varies greatly. The propagation distance of radio waves of the frequencies 71 with high propagation channel gain is long and these radio waves are received with high quality. However, the propagation distance of radio waves of the frequencies 72 with low propagation channel gain is short. When data is transferred by using the channel 70 including the frequencies 72 with such poor characteristics, the possibility of transfer failure is high. Note that, when the terminal 100 is an IoT device, the propagation channel gain is low often because the terminal 100 is fixed to a building and the propagation channel does not change. Moreover, in some cases, the propagation channel gain is low due to multiple path propagation in which strong reflection waves are generated because of a building made of metal or metal devices installed around the terminal 100. Accordingly, when LTE is employed, the characteristics of the channel 70 need to be improved by changing frequency allocation in the channel 70.

Figure 18:
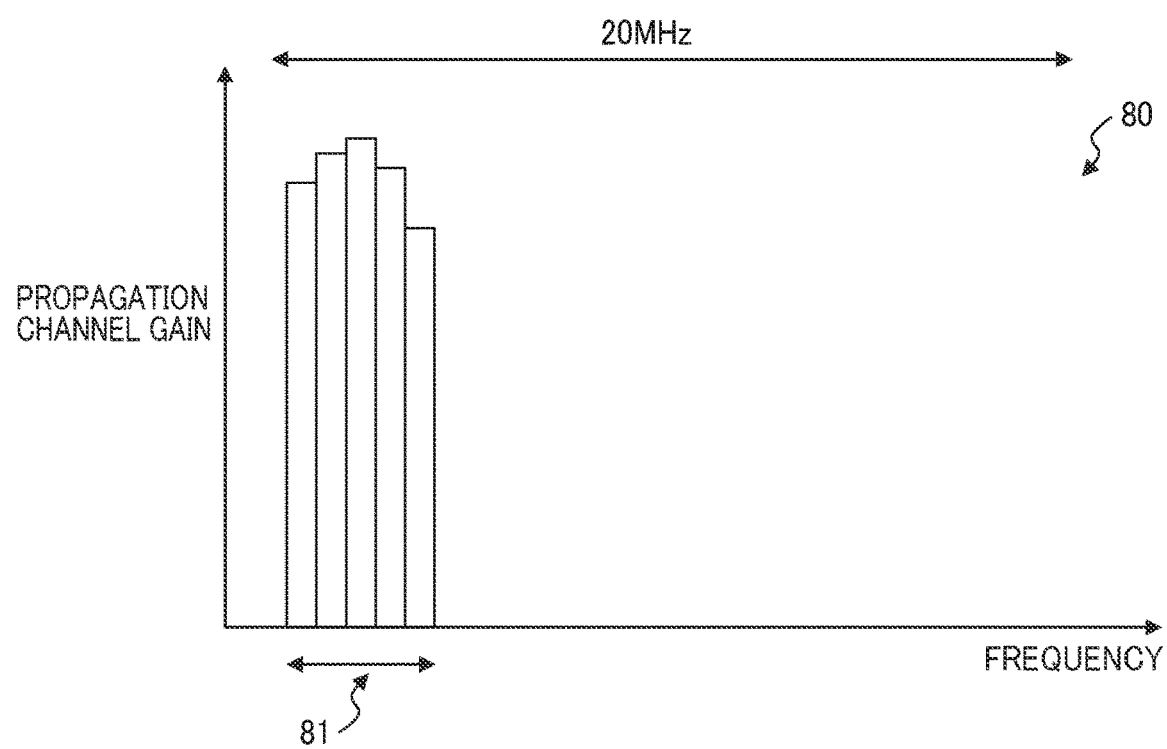
FIG. 18 is a graph illustrating an example of a channel 80 in which frequency allocation is changed.

FIG. 18 is a graph illustrating an example of a channel 80 in which the frequency allocation is changed. Specifically, in the channel 80, signals in a direction in which signals are transmitted from the terminal 100 to the communication base station 300 (uplink direction) are allocated to frequencies 81 limited within a predetermined range to simplify processes of the terminal 100. Specifically, in the channel 80, the signals are allocated to the frequencies 81 with high propagation channel gain. In other words, the frequency allocation is excellent.

Figure 19:
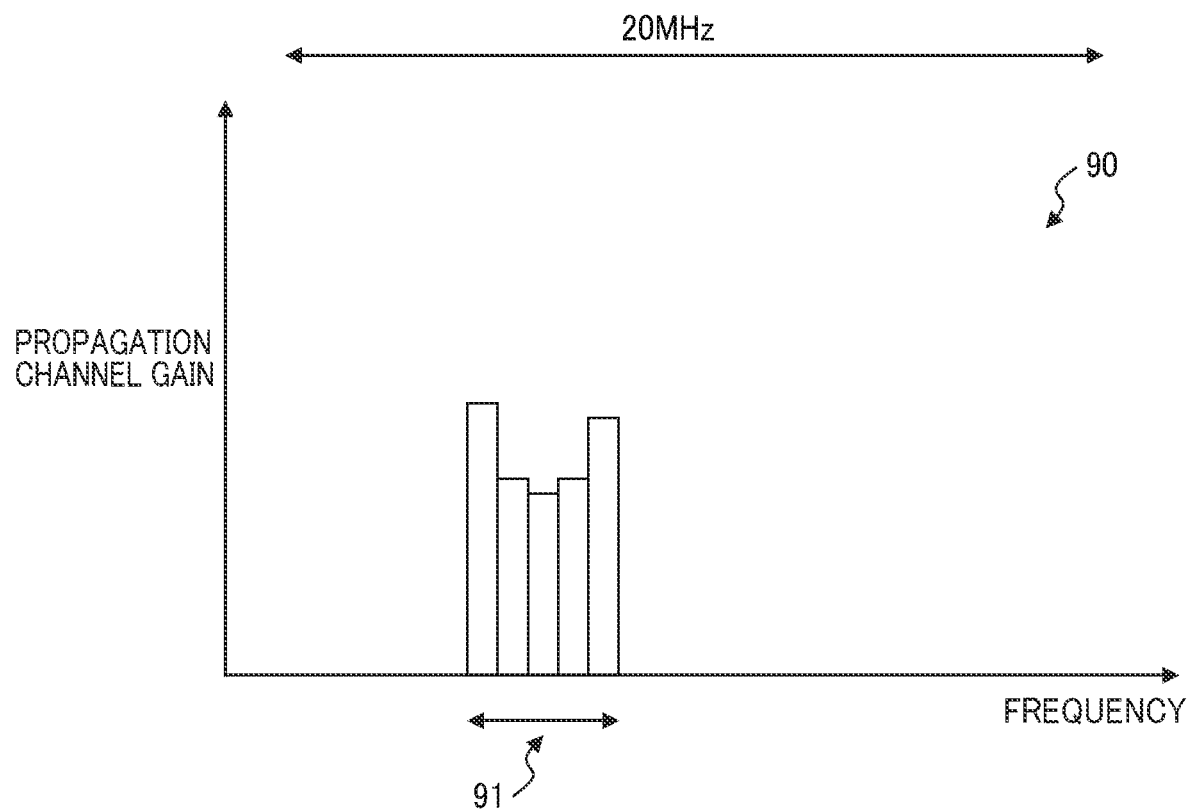
FIG. 19 is a graph illustrating another example of a channel in which the frequency allocation is changed.

Meanwhile, FIG. 19 is a graph illustrating another example of a channel in which the frequency allocation is changed. Also in this channel 90, the uplink signals are allocated to frequencies limited within a predetermined range. However, in the channel 90, the signals are allocated to the frequencies 91 with low propagation channel gain. In other words, the frequency allocation is not good.

As described above, in some cases, changing of the channel allocation does not stabilize the reception of the uplink signals by the communication base station 300 even when the position of the communication base station 300 is fixed.

Accordingly, in s4004 of FIG. 16, the center station 500 transmits a control signal which corrects the channel allocation. For example, the center station 500 transmits, to the base station control apparatus 520, an instruction to perform communication by causing the terminal 100 to report channel information in the sub-channel CQI method (information instructing the communication base station 300 to divide a frequency band to multiple frequency channels and perform communication with the terminal 100 by using each of the divided multiple frequency channels). The terminal 100 can be thereby made to normally operate.

Note that, since the traffic relating to the transmission in sub-channel CQI is large, a predetermined limit may be set on the transmission in sub-channel CQI depending on the characteristics of the terminal 100. For example, the control signal which changes the propagation channel inferring method (CQI method) to the sub-channel CQI is transmitted to the base station control apparatus 520 only when the terminal 100 satisfies a predetermined condition (for example, the position of the terminal 100 is fixed, the reception status of the signals constantly changes because the terminal 100 is attached to a moving object, or other similar conditions. For example, the terminal 100 includes a temperature sensor) and the terminal 100 has no mobility (for example, changes in the propagation channel other than changes in the external environment other than the terminal 100 are less likely to appear). Note that limits may be set on the number of times and frequency of data transmission in use of the sub-channel CQI.

Embodiment 3

In Embodiment 3, the hardware configuration relating to the power source device in the terminal 100 is different from those of the other embodiments.

Figure 20:
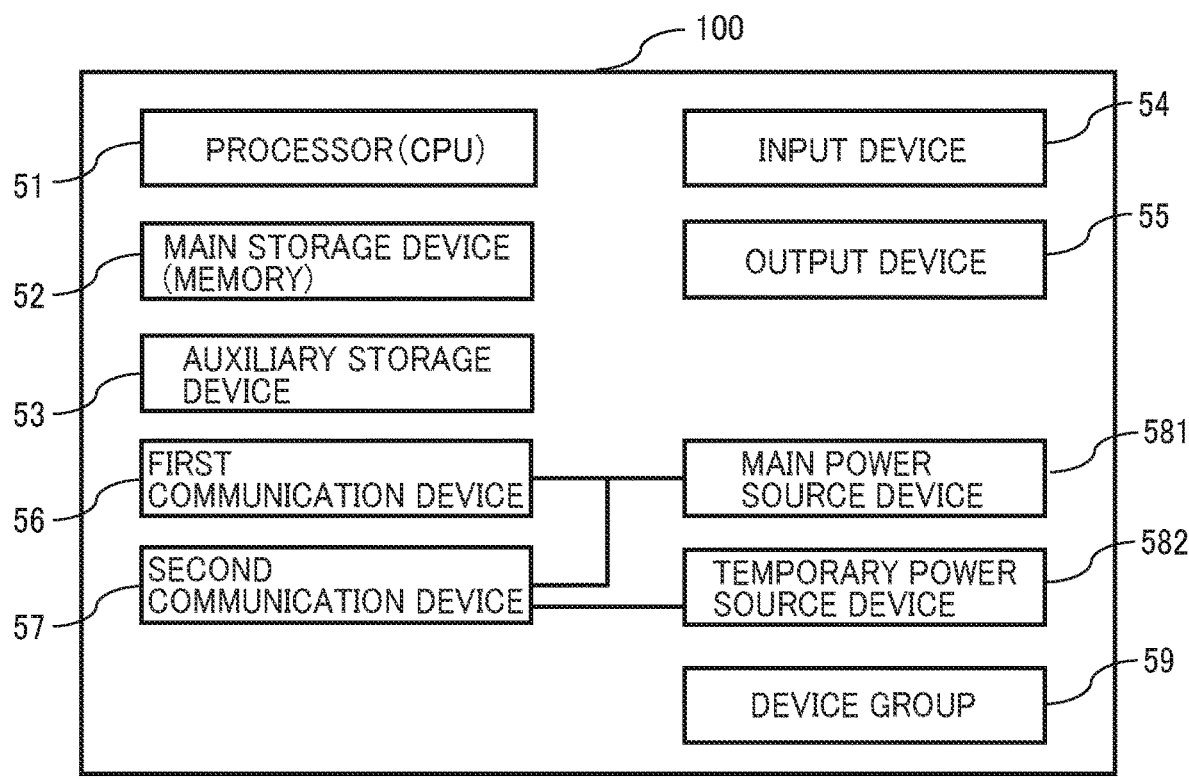
FIG. 20 is a diagram illustrating an example of the hardware configuration of the terminal 100 according to Embodiment 3.

FIG. 20 is a diagram illustrating an example of the hardware configuration of the terminal 100 according to Embodiment 3. The terminal 100 of the embodiment includes a main power source device 581 (first power source) and a temporary power source device 582 (second power source) as the power source device.

The first power source supplies power for transmission of the first information and the second information. Specifically, the main power source device 581 is a main power source which enables a steady operation of the terminal 100 and supplies power to the first communication device 56 and the second communication device 57. Since the main power source device 581 supplies power to the first communication device 56 with high power consumption, the main power source device 581 is capable of supplying large power.

The second power source supplies power for transmission of the second information. Specifically, the temporary power source device 582 is an auxiliary power source and supplies power only to the second communication device 57. Since the temporary power source device 582 supplies power only to the second communication device 57 with low power consumption, the temporary power source device 582 does not have to be capable of supplying large power. The temporary power source device 582 is, for example, a simple storage battery such as a capacitor.

Moreover, in the embodiment, the terminal 100 has the following function. Specifically, the terminal 100 has the function of transmitting the second information including information on the first power source based on the second power source when the terminal 100 determines that a failure has occurred in the first power source during the transmission of the first information (operation information 110) and the second information (status information 130) based on the first power source (main power source device 581).

Next, description is given of processes of the communication system 1 according to the embodiment which are different from the processes in Embodiment 1.

<Status Information Transmission Process>

Figure 21:
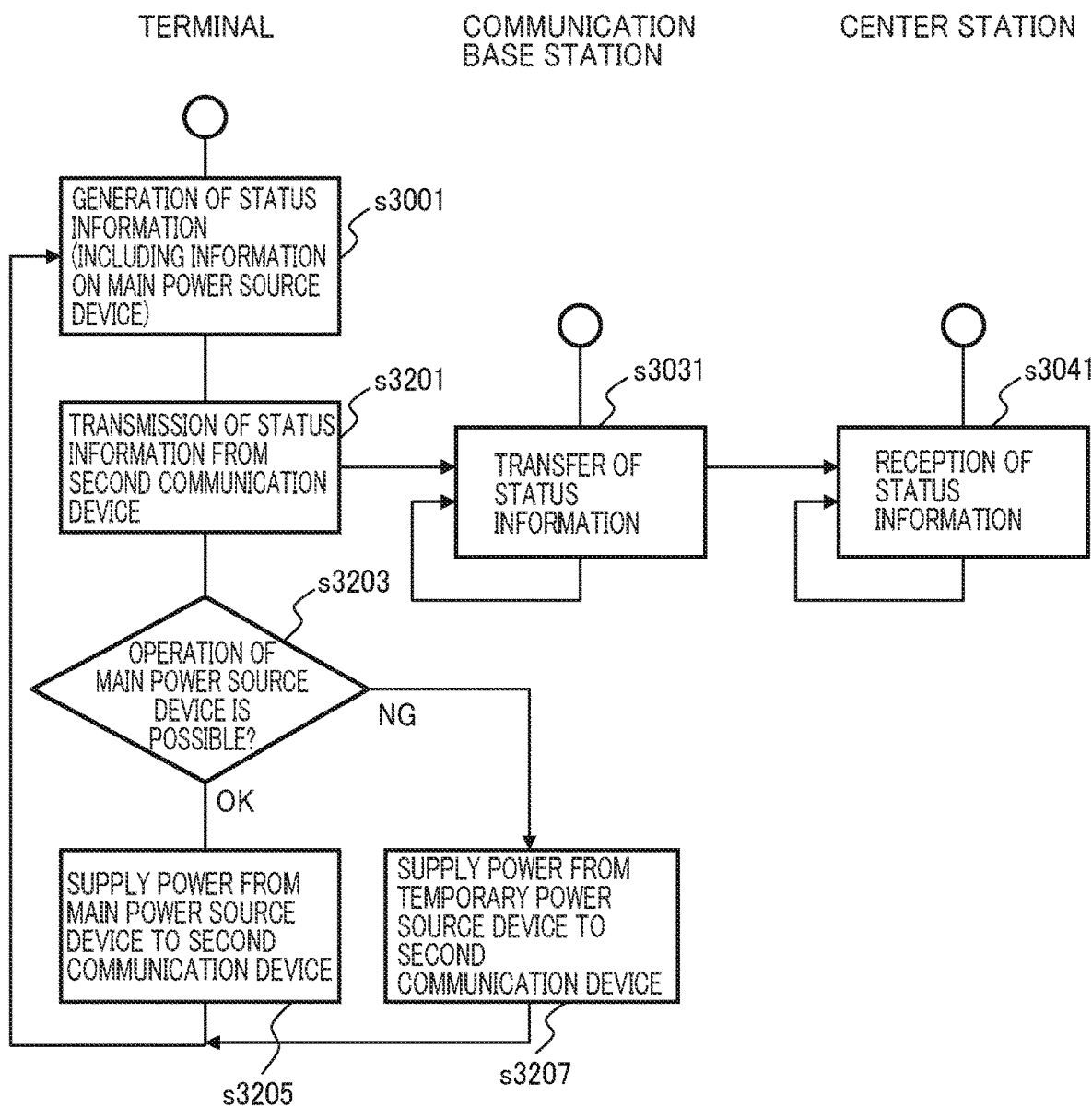
FIG. 21 is a flowchart illustrating an example of the status information transmission process according to Embodiment 3.

FIG. 21 is a flowchart illustrating an example of the status information transmission process according to Embodiment 3. The terminal 100 generates the status information 130 as in Embodiment 1 (s3001). Note that, in this case, the terminal 100 generates the status information 130 including power source information 133 which is information indicating the status of the main power source device 581 (information on voltage, current, and the like).

Then, as in Embodiment 1, the communication base station 300 receives the status information 130 transmitted from the terminal 100 and transmits the received status information 130 to the center station 500 (s3031, s3041).

Meanwhile, the terminal 100 determines whether there is abnormality in the power supply of the main power source device 581 based on the status information 130 generated in s3201 (s3203). Specifically, for example, the terminal 100 determines whether the voltage or current indicated in the power source information 133 of the status information 130 exceeds a predetermined threshold.

When there is no abnormality in the power supply of the main power source device 581 (s3203: OK), the terminal 100 transmits, to the main power source device 581, a control signal which causes the main power source device 581 to continue the power supply to the second communication device 57 or performs no particular process (s3205). Thereafter, the processes of s3001 and beyond are repeated.

Meanwhile, when there is abnormality in the power supply of the main power source device 581 (s3203: NG), the terminal 100 transmits, to the main power source device 581, the control signal which causes the main power source device 581 to stop the power supply to the second communication device 57 and transmits, to the temporary power source device 582, a control signal which causes the temporary power source device 582 to start the power supply to the second communication device 57 (s3207). Thereafter, the processes of s3001 and beyond are repeated.

As described above, in the communication system 1 of the embodiment, even when there is abnormality in the power supply of the main power source device 581 (for example, when the main power source device 581 fails or the supply voltage or current decreases due to usage), the terminal 100 transmits the status information 130 to the communication base station 300 based on the temporary power source device 582 and the center station 500 can thereby detect the status of the terminal 100 (for example, detect that abnormality has occurred in the main power source device 581).

Specifically, since the first communication method in the communication system 1 is a method in which a large amount of information is packed in multi-level communication to improve the spectral efficiency, the first communication method generally consumes a large amount of power. Thus, the first communication device 56 cannot transmit information unless it receives sufficient supply of power. Meanwhile, since the power consumption necessary for the second communication method is low (for example, LPWA), the second communication device 57 can transmit information even if it receives small supply of power (for example, even if the temporary power source device 582 is a simple storage battery such as a capacitor). Thus, even when a situation where the main power source device 581 cannot supply sufficient power occurs, the temporary power source device 582 makes it possible to transmit the status of the terminal 100 (status information 130) to the center station 500 and report the abnormality in the power supply of the main power source device 581.

Embodiment 4

In the aforementioned embodiments, the operation information transmission process and the status information transmission process are assumed to be executed independently. Meanwhile, in this embodiment, these processes are exclusively executed as a series of processes (hereafter, referred to as information transmission process).

The hardware configuration of the communication system 1 according to the embodiment is the same as that in Embodiment 1.

The terminal 100 in the communication system 1 according to the embodiment particularly has the following function. Specifically, the terminal 100 determines whether the terminal 100 can transmit the first information (operation information 110). When determining that the first information can be transmitted, the terminal 100 transmits only the first information out of the first information and the second information (status information 130). When determining that the first information cannot be transmitted, the terminal 100 transmits only the second information out of the first information and the second information.

Next, description is given of processes performed by the communication system 1 according to the embodiment which are different from those in Embodiment 1.

<Information Transmission Process>

Figure 22:
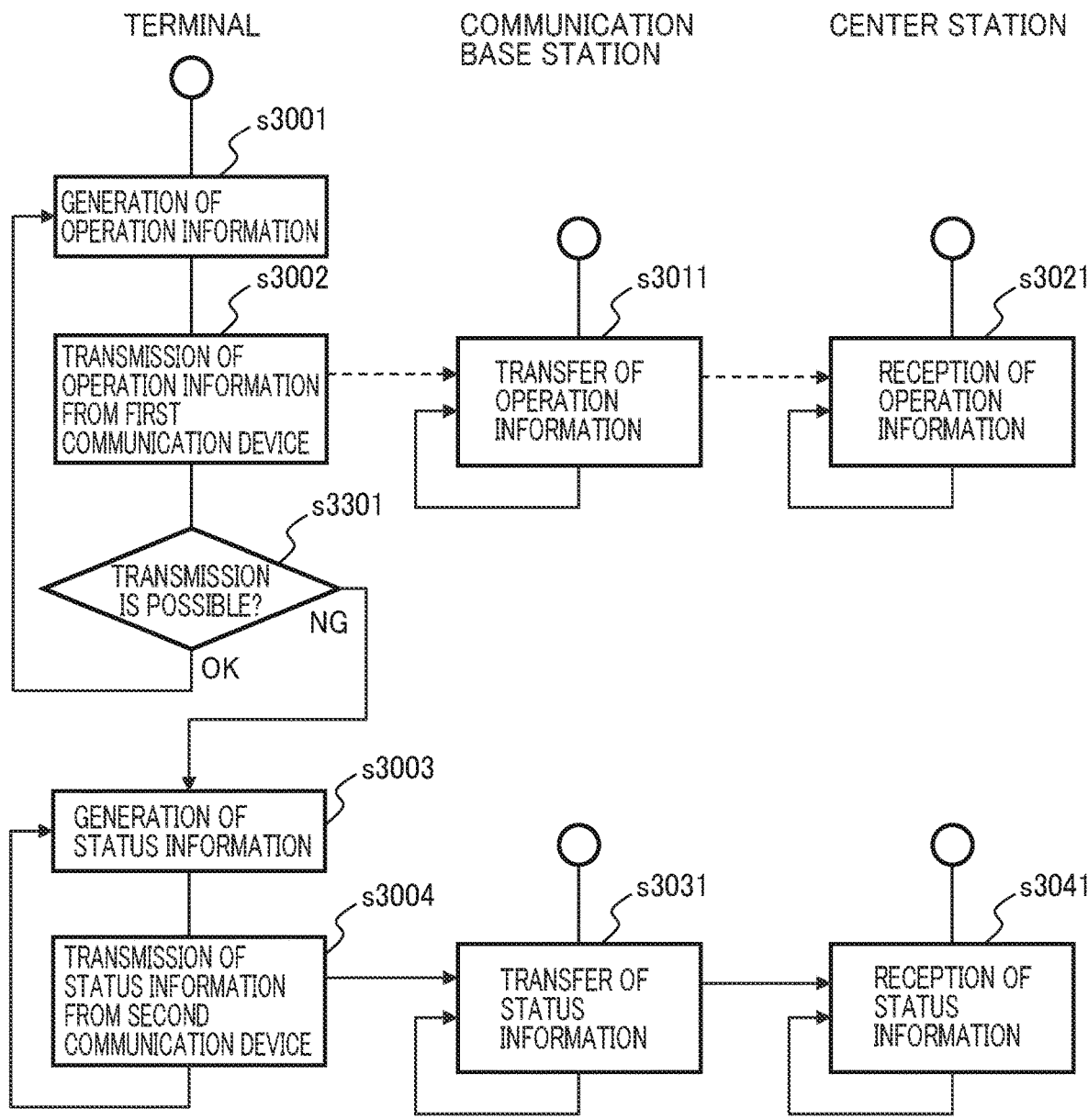
FIG. 22 is a flowchart explaining an example of an information transmission process according to Embodiment 4.

FIG. 22 is a flowchart explaining an example of the information transmission process according to Embodiment 4. First, as in Embodiment 1, the terminal 100 generates the operation information 110 (s3001) and transmits the generated operation information 110 by using the first communication device 56 (s3002). Then, the communication base station 300 transmits the operation information 110 received from the terminal 100 to the center station 500 (s3011, s3021).

In this case, in the embodiment, the terminal 100 determines whether the terminal 100 is in a state capable of transmitting the operation information 110 (s3301). Specifically, for example, the terminal 100 determines whether the voltage or current value of the power source device 58 is greater than a predetermined threshold. Moreover, assuming that the hardware configuration is that according to Embodiment 3, for example, the terminal 100 may determine whether the voltage or current value of the main power source device 581 is greater than the predetermined threshold.

When the terminal 100 is in the state capable of transmitting the operation information 110 (s3301: OK), the terminal 100 repeats the processes of s3001 and beyond. Meanwhile, when the terminal 100 is not in the state capable of transmitting the operation information 110 (s3301: NG), as in Embodiment 1, the terminal 100 generates the status information 130 (s3003) and transmits the status information 130 to the communication base station 300 by using the second communication device 57 (s3004). Processes hereafter are the same as those in Embodiment 1 (s3031, s3041).

As described above, the second communication device 57 of the embodiment generally does not operate and operates to perform an emergency operation of transmitting the status information 130 only when the transmission of the operation information 110 becomes impossible. Note that, the second communication device 57 does not operate while the first communication device 56 is operating.

Next, characteristics of the aforementioned communication system 1 of the embodiment are described.

Figure 23:
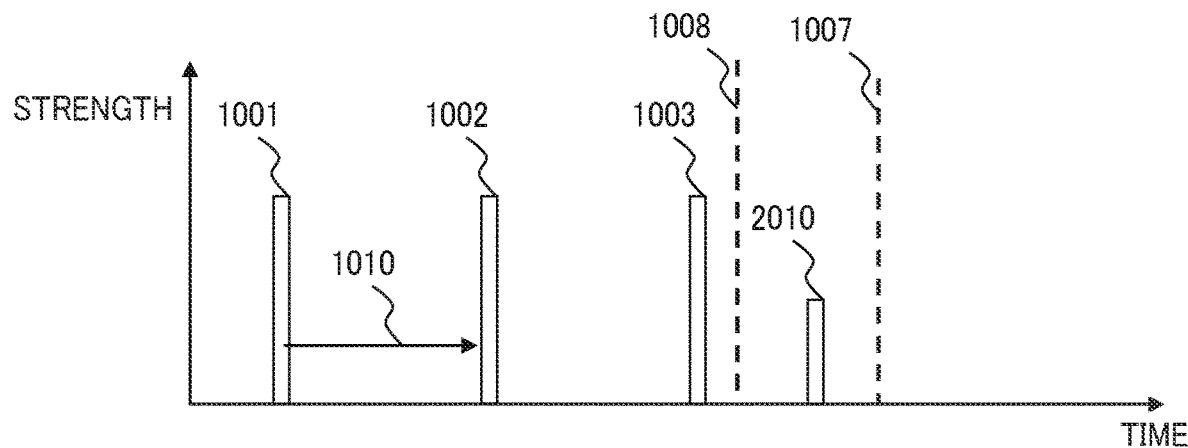
FIG. 23 is a graph explaining an example of the operation information 110 transmitted by the terminal 100 and changes in the signal strength in this transmission in the communication system 1 including the terminal 100 with a power source device 58.

FIG. 23 is a graph explaining an example of the operation information 110 transmitted by the terminal 100 and changes in the signal strength in this transmission in the communication system 1 including the terminal 100 with the power source device 58. In the graph of FIG. 23, the horizontal axis represents time and the vertical axis represents the strength of signals relating to the operation information 110. When the terminal 100 is normally operating, the signals 1001 to 1003 relating to the operation information 110 are transmitted at constant time intervals 1010. However, when the voltage of the power source device 58 decreases, the strength of the signals relating to the operation information 110 from the first communication device 56 also decreases and the signals completely disappear after a certain timing 1007. However, at a timing 1008 just before the timing 1007, the communication device is switched and the second communication device 57 can start transmission of a signal 2010 relating to the status information 130. The server apparatus 700 can thereby perform analysis relating to the communication status of the terminal 100. Note that, in this case, the data transmission cycle (second cycle) of the second communication device 57 is preferably sufficiently shorter than the data transmission cycle (first cycle) of the first communication device 56.

Figure 24:
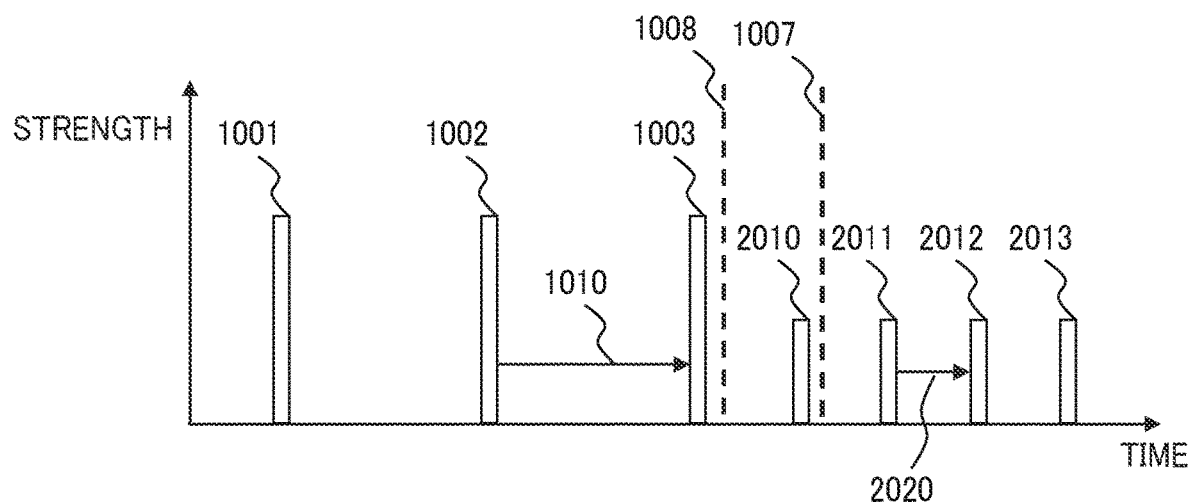
FIG. 24 is a graph explaining an example of the operation information 110 transmitted by the terminal 100 and changes in the signal strength in this transmission in the communication system 1 including the terminal 100 with a main power source device 581 and a temporary power source device 582.

Next, FIG. 24 is a graph explaining an example of the operation information 110 transmitted by the terminal 100 and changes in the signal strength in this transmission in the communication system 1 including the terminal 100 with the main power source device 581 and the temporary power source device 582. In the graph of FIG. 24, the horizontal axis represents time and the vertical axis represents the strength of the signals relating to the operation information 110. When the terminal 100 is normally operating, the signals 1001 to 1003 relating to the operation information 110 are transmitted at constant time intervals 1010. However, when the voltage of the main power source device 581 decreases, the strength of the signals relating to the operation information 110 from the first communication device 56 also decreases and the signals completely disappear after a certain timing 1007. However, after a timing 1008 just before the timing 1007, the second communication device 57 receives power supply by the temporary power source device 582 and can thereby continue to transmit signals 2010 to 2013 relating to the status information 130, where time intervals 2020 of this transmission are shorter than the time intervals 1010 of the transmission of signals relating to the operation information 110 by the first communication device 56. The server apparatus 700 can thereby perform analysis relating to the communication status of the terminal 100.

Although the embodiments of the present invention have been described above, the embodiments of the present invention are not limited to those described above and various changes can be made within a scope not departing from the spirit of the invention.

Figure 25:
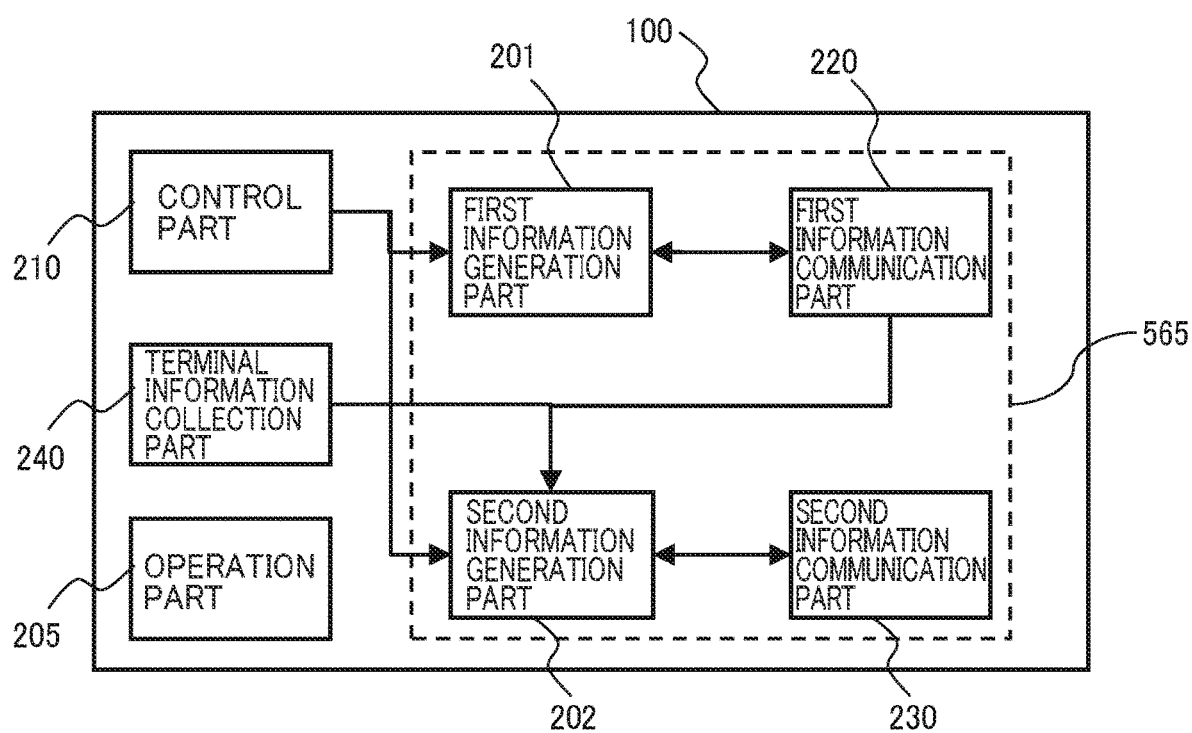
FIG. 25 is a diagram illustrating an example of a hardware configuration of the communication system 1 in which a first communication device 56 and a second communication device 57 are integrally configured as a communication device 565.

For example, as illustrated in FIG. 25, the first communication device 56 and the second communication device 57 may be integrally configured as a communication device 565. In this case, the control part 210 of the terminal 100 switches the communication between the communication of the first communication method and the communication of the second communication method through software. The terminal 100 thereby only needs to be provided with one communication device and the size of the terminal 100 can be reduced.

Moreover, although the first information generation part 201 and the second information generation part 202 are separate function parts, these parts may be configured as one function part.

Furthermore, the first communication method and the second communication method may each be a wireless communication method or a wired communication method.

At least the following matters are apparent from the aforementioned statements in the description. Specifically, the communication system 1 of each embodiment may be configured such that: the second information includes the information indicating the statuses of the devices forming the terminal; when the server apparatus determines that the first information is not normally received, the server apparatus determines whether there is abnormality in the communication status of the terminal based on the received second information; and when the server apparatus determines that there is abnormality in the communication status, the server apparatus outputs information indicating this abnormality.

The server apparatus 700 determines whether there is abnormality in the communication status of the terminal 100 based on the statuses of the devices forming the terminal 100 and, when determining that there is abnormality in the communication status, outputs information indicating this abnormality as described above and this allows the maintenance personnel of the communication system 1 to determine the device (part) causing the abnormality in the terminal 100 and perform appropriate management such as maintenance or repair on the terminal 100.

Moreover, the communication system 1 of the embodiment may be configuration such that: the communication system includes the base station which receives the information transmitted by the terminal and which transfers the information to the server apparatus; when the server apparatus determines that the first information is not normally received from the base station, the server apparatus determines whether the cause of the abnormality in the communication of the terminal is in the base station based on the received second information; and when the server apparatus determines that the cause of the abnormality in the communication of the terminal is in the base station, the server apparatus transmits the predetermined control information to the base station and the base station controls itself based on the received control information.

When the server apparatus 700 is not normally receiving the operation information 110 and there is abnormality in the terminal 100 based on the communication base station 300, the server apparatus 700 transmits the control information to the communication base station 300 and the communication base station 300 controls itself based on the transmitted control information as described above and this allows the communication base station 300 to normally receive the information from the terminal 100 and surely transfer it to the server apparatus 700.

Moreover, the communication system 1 of the embodiment may be configured such that: when the server apparatus determines that the first information is not normally received from the terminal, the server apparatus determines whether the cause of the abnormality in the communication of the terminal is in the base station by determining whether the reception strengths of the radio waves received by the terminal in the first communication method and the second communication method are lower than the predetermined thresholds, the reception strengths being information indicated in the received second information; and when the server apparatus determines that the reception strengths of the radio waves received by the terminal in the first communication method and the second communication method are lower than the predetermined thresholds, the server apparatus transmits the control information which adjusts the transmission output of the radio waves or the directivity of the antenna, to the base station.

When the server apparatus 700 determines that the reception strengths of the radio waves received by the terminal 100 in the first communication method and the second communication method are low by using the communication information 134 of the status information 130, the server apparatus 700 makes the communication base station 300 adjust the transmission output of the radio waves or the directivity of the antenna as described above and the transmission and reception of information via the communication base station 300 can be thereby recovered to a normal state. For example, when a layout is changed in a factory installed with the communication system 1 and the strength of the reception signal (operation information 110) from the first communication device 56 sharply decreases, the server apparatus 700 can recover the communication to a normal state. Specifically, since it is inferred that the reception levels of the signals received by the terminal 100 are generally low due to changes in the external environment other than the terminal 100, the maintenance personnel can take appropriate actions.

Moreover, the communication system 1 of the embodiment may be configured such that: when the server apparatus determines that the first information is not normally received from the terminal, the server apparatus determines whether there is abnormality in the communication status of the terminal by determining whether the reception strengths of the radio waves received by the terminal in the first communication method and the second communication method are higher than the predetermined thresholds, the reception strengths being information indicated in the received second information; and when the server apparatus determines that the reception strengths of the radio waves received by the terminal in the first communication method and the second communication method are higher than the predetermined thresholds, the server apparatus outputs information indicating that there is abnormality in the transmission of information by the terminal.

When the server apparatus 700 determines that the reception strengths of the radio waves received by the terminal 100 in the first communication method and the second communication method are high by using the communication information 134 of the status information 130, the server apparatus 700 outputs the information indicating that there is abnormality in the transmission of information by the terminal 100 as described above and this allows the maintenance personnel of the communication system 1 to determine the cause of the abnormality in the communication status. For example, since it is inferred that the signal from another communication apparatus has normally reached the terminal 100 but the signal from the terminal 100 has not normally reached the other communication apparatus, the maintenance personnel can take appropriate actions.

Moreover, the communication system 1 of the embodiment may be configured such that: when the server apparatus determines that the first information is not normally received from the terminal and determines that that the reception strength of the radio wave received by the terminal in the first communication method is lower than the predetermined threshold and the reception strength of the radio wave received by the terminal in the second communication method is higher than the predetermined threshold, the server apparatus outputs information indicating that failure has occurred in the communication of the terminal in the first communication method, the reception strengths being information indicated in the second information.

When the server apparatus 700 determines that the reception strength of the radio wave received by the terminal 100 in the first communication method is low and the reception strength of the radio wave received by the terminal 100 in the second communication method is high by using the communication information 134 of the status information 130, the server apparatus 700 outputs information indicating that a failure has occurred in the communication by the terminal 100 in the first communication method as described above and the maintenance personnel of the communication system 1 can thereby determine the cause of the abnormality in the communication status. For example, the maintenance personnel can prepare extra parts corresponding to the first communication device 56 and the like and perform investigation at the site.

Moreover, the communication system 1 of the embodiment may be configured such that: the communication system includes the base station which receives the information transmitted by the terminal and which transfers the information to the server apparatus; when the server apparatus determines that the first information is normally received from the terminal, the server determines whether the reception of the first information in the predetermined period before and after this determination is stable; when the server apparatus determines that the reception of the first information is unstable, the server apparatus transmits, to the base station, the control signal which causes the base station to perform transmission of the first information with the channel used for the reception and transmission of the first information changed to new divided multiple channels; and the base station controls itself based on the received control information.

When the reception of the operation information 110 is unstable, the currently used channel is changed based on new divided multiple channels (for example, switched to sub-channel CQI method) as described above and this enables the communication of the operation information 110 to be recovered to a normal state.

Moreover, the communication system 1 of the embodiment may be configured such that: the terminal includes the first power source which supplies power for transmitting the first information and the second information and the second power source which supplies power for transmitting the second information; and when the terminal determines that a failure has occurred in the first power source during transmission of the first information and the second information based on the first power source, the terminal transmits the second information including the information on the first power source based on the second power source.

When failure occurs in the main power source device 581, the terminal 100 can thereby continuously transmit the status information 130 and the server apparatus 700 can obtain information on the failure of the main power source device 581 based on the transmitted status information 130. The maintenance personnel of the communication system 1 can thereby perform appropriate management such as maintenance and repair on the main power source device 581 of the terminal 100.

Moreover, the communication system 1 of the embodiment may be configured such that; the terminal determines whether the first information can be transmitted; when the terminal determines that the first information can be transmitted, the terminal transmits only the first information out of the first information and the second information; when the terminal determines that the first information cannot be transmitted, the terminal transmits only the second information out of the first information and the second information.

The terminal 100 transmits only the first information when the operation information 110 can be transmitted and transmits only the status information 130 when the first information cannot be transmitted as described above and this reduces the communication amount in the communication system 1 and avoids busy communication. The communication system 1 can be thus stably operated.

Moreover, the communication system 1 of the embodiment may be configured such that the first communication method and the second communication method are wireless communication methods and the potential propagation distance of the radio wave in the second communication method is longer than that in the first communication method.

The terminal 100 can thereby surely transmit the status of itself to the center station 500 when the terminal 100 is away from the communication base station 300 or the center station 500 due to reasons such as the terminal 100 being movable.

Moreover, the communication system 1 of the embodiment may be configured such that the cycle of the transmission of the second information is shorter than the cycle of the transmission of the first information.

The server apparatus 700 can thereby more surely obtain the communication status of the terminal 100 provided by the status information 130 and the maintenance personnel of the communication system 1 can determine the cause of the abnormality in the terminal 100.

What is claimed is:

1. A communication system comprising:
a terminal configured to perform a predetermined operation and including a processor, a memory, a first communication device configured to transmit first information relating to the predetermined operation by a first communication method, a second communication device configured to transmit second information by a second communication method, a primary power source connected to the first communication device and the second communication device and configured to power the first communication device and the second communication device and a secondary power source connected to only the second communication device, among the first communication device and the first communication device; and
a server apparatus configured to receive the first information transmitted from the terminal and receive the second information from the terminal,
wherein the second information transmitted from the second communication device includes information indicating a status of the primary power source,
wherein the second communication method has a higher frequency and a lower strength than the first communication method,
wherein the terminal simultaneously uses the first communication device and the second communication device to transmit the first information using the first communication method and transmit the second information using the second communication device, respectively, and the terminal is configured to, upon determining there is a failure in the primary power source, cause the primary power source to stop powering the second communication device and transmit a signal to the second power source to start power supply to the second communication device, and
wherein the server apparatus is configured to determine whether the first information is normally received from the terminal and, upon determining that the first information is not normally received, perform predetermined processing depending on a communication status of the terminal, which is based on the received second information.

2. The communication system according to claim 1, wherein
the second information includes information indicating statuses of devices forming the terminal,
when the server apparatus determines that the first information is not normally received, the server apparatus determines whether there is abnormality in the communication status of the terminal based on the received second information, and
when the server apparatus determines that there is abnormality in the communication status, the server apparatus outputs information indicating there is the abnormality in the communication status.

3. The communication system according to claim 1, further comprising a base station configured to receive the information transmitted by the terminal and transfer the information to the server apparatus,
wherein the server apparatus:
upon determining that the first information is not normally received from the base station, determine whether a cause of abnormality in communication of the terminal is in the base station based on the received second information,
upon determining that the cause of the abnormality in the communication of the terminal is in the base station, transmit predetermined control information to the base station, and
the base station controls itself based on the received control information.

4. The communication system according to claim 3, wherein when the server apparatus determines that the first information is not normally received from the terminal, the server apparatus determines whether the cause of the abnormality in the communication of the terminal is in the base station by determining whether reception strengths of radio waves received by the terminal in the first communication method and the second communication method are lower than predetermined thresholds, the reception strengths being information indicated in the received second information, and when the server apparatus determines that the reception strengths of the radio waves received by the terminal in the first communication method and the second communication method are lower than the predetermined thresholds, the server apparatus transmits control information which adjusts transmission outputs of the radio waves or a directivity of an antenna, to the base station.

5. The communication system according to claim 2, wherein when the server apparatus determines that the first information is not normally received from the terminal, the server apparatus determines whether there is abnormality in the communication status of the terminal by determining whether reception strengths of radio waves received by the terminal in the first communication method and the second communication method are higher than predetermined thresholds, the reception strengths being information indicated in the received second information, and when the server apparatus determines that the reception strengths of the radio waves received by the terminal in the first communication method and the second communication method are higher than the predetermined thresholds, the server apparatus outputs information indicating that there is abnormality in the transmission of information by the terminal.

6. The communication system according to claim 2, wherein when the server apparatus determines that the first information is not normally received from the terminal and determines that a reception strength of a radio wave received by the terminal in the first communication method is lower than a predetermined threshold and a reception strength of a radio wave received by the terminal in the second communication method is higher than a predetermined threshold, the server apparatus outputs information indicating that a failure has occurred in the communication of the terminal in the first communication method, the reception strengths being information indicated in the second information.

7. The communication system according to claim 1, further comprising a base station configured to receive the information transmitted by the terminal and transfer the information to the server apparatus, wherein when the server apparatus determines that the first information is normally received from the terminal, the server apparatus determines whether reception of the first information in a predetermined period before and after the determination is stable, when the server apparatus determines that the reception of the first information in the predetermined period before and after the determination is unstable, the server apparatus transmits, to the base station, a control signal which causes the base station to perform transmission of the first information with a channel used for transmission and reception of the first information changed to a plurality of new divided channels, and the base station controls itself based on the received control information.

8. A communication method performed in a communication system including a terminal which performs a predetermined operation and which includes a processor, a memory, and a first communication device configured to transmit first information relating to the predetermined operation by a first communication method, a second communication device configured to transmit second information by a second communication method, a primary power source connected to the first communication device and the second communication device and configured to power the first communication device and the second communication device and a secondary power source connected to only the second communication device, among the first communication device and the first communication device, and a server apparatus which receives the first information and the second information transmitted from the terminal wherein the second information transmitted from the second communication device includes information indicating a status of the primary power source, wherein the second communication method has a higher frequency and a lower strength than the first communication method, the communication method comprising:

simultaneously using the first communication device and the second communication device to transmit the first information using the first communication method and transmit the second information using the second communication device, respectively;

determining, by the terminal, there is a failure in the primary power source, and upon determining there is the failure, causing the primary power source to stop powering the second communication device and transmits a signal to the second power source to start power supply to the second communication device;

causing the server apparatus to determine whether the first information is normally received from the terminal and, and upon the server apparatus determining that the first information is not normally received, performing predetermined processing depending on a communication status of the terminal, which is based on the received second information.

9. The communication method according to claim 8, wherein the communication system includes a base station configured to receive the information transmitted by the terminal and transfer the information to the server apparatus, the communication method comprises:

when the server apparatus determines that the first information is not normally received from the base station, causing the server apparatus to determine whether a cause of abnormality in communication of the terminal is in the base station based on the received second information, when the server apparatus determines that the cause of the abnormality in the communication of the terminal is in the base station, causing the server apparatus to transmit predetermined control information to the base station, and causing the base station to control itself based on the received control information.

* * * * *